US009552840B2

(12) United States Patent
Kim et al.

(10) Patent No.: US 9,552,840 B2
(45) Date of Patent: Jan. 24, 2017

(54) THREE-DIMENSIONAL SOUND CAPTURING AND REPRODUCING WITH MULTI-MICROPHONES

(75) Inventors: Lae-Hoon Kim, San Diego, CA (US); Erik Visser, San Diego, CA (US); Pei Xiang, San Diego, CA (US); Ian Ernan Liu, San Diego, CA (US); Dinesh Ramakrishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 968 days.

(21) Appl. No.: 13/280,303

(22) Filed: Oct. 24, 2011

(65) Prior Publication Data
US 2012/0128160 A1    May 24, 2012

Related U.S. Application Data

(60) Provisional application No. 61/406,396, filed on Oct. 25, 2010, provisional application No. 61/466,432, filed on Mar. 22, 2011.

(51) Int. Cl.
| | | |
|---|---|---|
| *H04R 3/00* | (2006.01) | |
| *H04R 1/02* | (2006.01) | |
| *H04R 9/06* | (2006.01) | |
| *G11B 20/00* | (2006.01) | |

(52) U.S. Cl.
CPC ............. *G11B 20/00* (2013.01); *H04R 3/005* (2013.01); *H04R 2201/401* (2013.01); *H04S 2400/15* (2013.01)

(58) Field of Classification Search
CPC ... H04R 3/005; H04R 29/008; H04R 2430/20; H04R 2201/401; H04S 7/307; H04S 3/02; H04S 3/00; H04S 2400/15; G11B 20/00

USPC ............................ 381/17, 92, 313, 333, 334
See application file for complete search history.

(56) References Cited

U.S. PATENT DOCUMENTS

| | | | |
|---|---|---|---|
| 5,987,142 | A | 11/1999 | Courneau et al. |
| 6,005,610 | A | 12/1999 | Pingali |
| 6,507,659 | B1 | 1/2003 | Iredale et al. |
| 7,327,852 | B2 | 2/2008 | Ruwisch |
| 7,606,373 | B2 | 10/2009 | Moorer |
| 8,855,341 | B2 | 10/2014 | Kim et al. |
| 2002/0167862 | A1 | 11/2002 | Tomasi et al. |

(Continued)

FOREIGN PATENT DOCUMENTS

| | | |
|---|---|---|
| CN | 1294471 A | 5/2001 |
| CN | 1805278 A | 7/2006 |

(Continued)

OTHER PUBLICATIONS

International Search Report and Written Opinion—PCT/US2011/057728.
—ISA/EPO—Feb. 6, 2012.

*Primary Examiner* — Vivian Chin
*Assistant Examiner* — Douglas Suthers
(74) *Attorney, Agent, or Firm* — Austin Rapp & Hardman

(57) ABSTRACT

A method for audio signal processing is described. The method includes decomposing a recorded auditory scene into a first category of localizable sources and a second category of ambient sound. The method also includes recording an indication of the directions of each of the localizable sources. The method may be performed with a device having a microphone array.

40 Claims, 29 Drawing Sheets

(56) References Cited

U.S. PATENT DOCUMENTS

| | | |
|---|---|---|
| 2003/0118197 A1 | 6/2003 | Nagayasu et al. |
| 2005/0069149 A1 | 3/2005 | Takahashi et al. |
| 2005/0147257 A1 | 7/2005 | Melchior et al. |
| 2005/0226437 A1 | 10/2005 | Pellegrini et al. |
| 2006/0045294 A1 | 3/2006 | Smyth |
| 2006/0159281 A1* | 7/2006 | Koh et al. ............ 381/92 |
| 2006/0195324 A1 | 8/2006 | Birk et al. |
| 2008/0089531 A1 | 4/2008 | Koga et al. |
| 2008/0192968 A1 | 8/2008 | Ho et al. |
| 2008/0247562 A1 | 10/2008 | Nagayasu et al. |
| 2008/0247565 A1* | 10/2008 | Elko et al. ............ 381/92 |
| 2009/0012779 A1 | 1/2009 | Ikeda et al. |
| 2009/0129620 A1 | 5/2009 | Tagawa et al. |
| 2009/0164212 A1* | 6/2009 | Chan et al. ............ 704/226 |
| 2010/0046770 A1 | 2/2010 | Chan et al. |
| 2010/0098258 A1 | 4/2010 | Thorn |
| 2011/0033063 A1 | 2/2011 | McGrath et al. |
| 2011/0038489 A1 | 2/2011 | Visser et al. |
| 2012/0128166 A1 | 5/2012 | Kim et al. |
| 2012/0128175 A1 | 5/2012 | Visser et al. |

FOREIGN PATENT DOCUMENTS

| | | |
|---|---|---|
| CN | 101133679 A | 2/2008 |
| JP | 07095698 | 4/1995 |
| JP | H07336250 A | 12/1995 |
| JP | H0215497 A | 8/1998 |
| JP | 2002135898 A | 5/2002 |
| JP | 2005109830 A | 4/2005 |
| JP | 2005176063 A | 6/2005 |
| JP | 2005176138 A | 6/2005 |
| JP | 2006066988 A | 3/2006 |
| JP | 2007266754 A | 10/2007 |
| JP | 2007318373 A | 12/2007 |
| JP | 2008507926 A | 3/2008 |
| JP | 2008079255 A | 4/2008 |
| JP | 2008512015 A | 4/2008 |
| JP | 2008131616 A | 6/2008 |
| JP | 2008193420 A | 8/2008 |
| JP | 2008219458 A | 9/2008 |
| JP | 2009044588 A | 2/2009 |
| JP | 2009296232 A | 12/2009 |
| JP | 2010506525 A | 2/2010 |
| JP | 2010128952 A | 6/2010 |
| JP | 2012523731 A | 10/2012 |
| KR | 19990076219 | 10/1999 |
| KR | 20090131237 A | 12/2009 |
| WO | WO-2006028587 A2 | 3/2006 |
| WO | WO-2007099908 A1 | 9/2007 |
| WO | WO-2008043731 A1 | 4/2008 |
| WO | WO-2009086017 | 7/2009 |
| WO | WO-2009117471 A1 | 9/2009 |
| WO | WO-2010048620 A1 | 4/2010 |
| WO | WO-2010116153 A1 | 10/2010 |

* cited by examiner

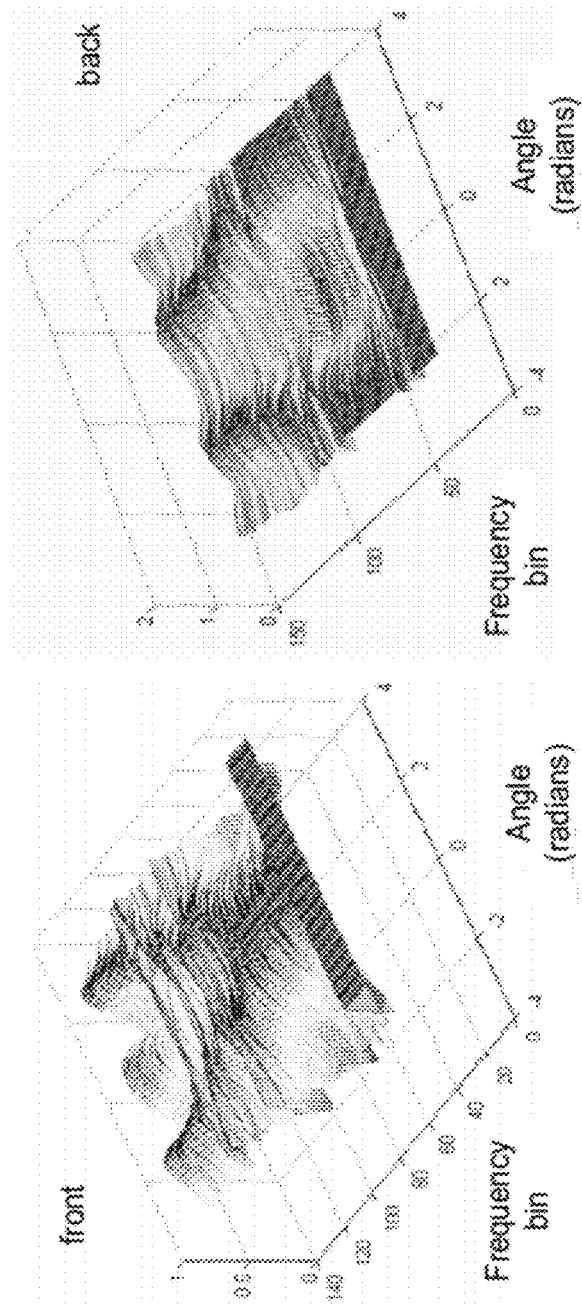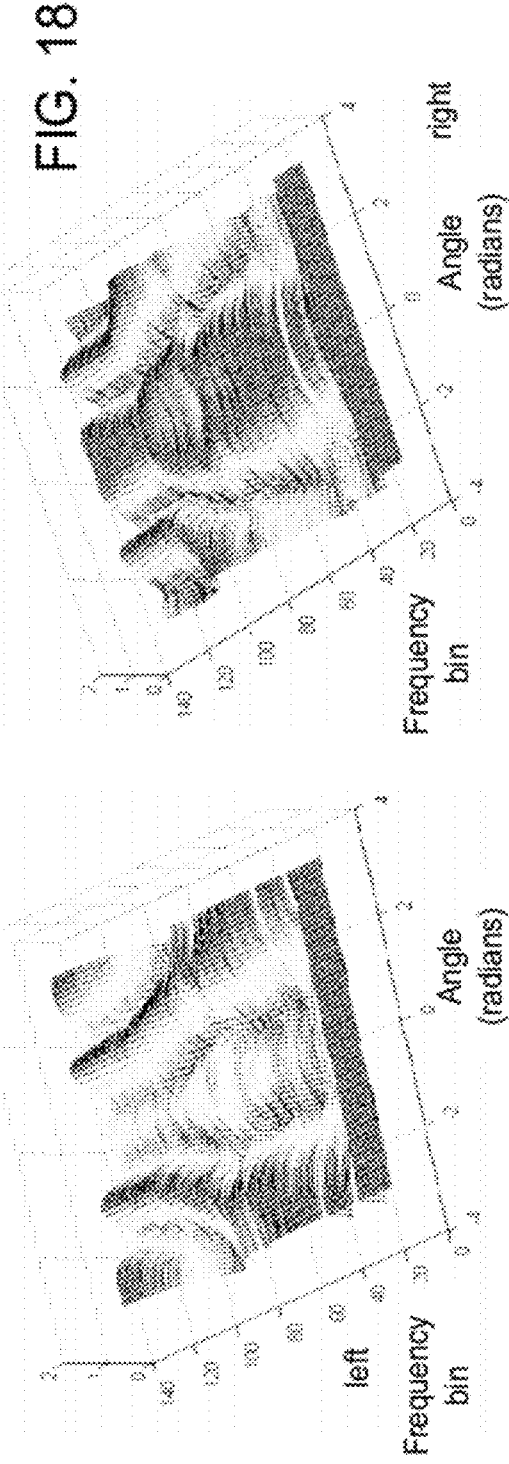
FIG. 18

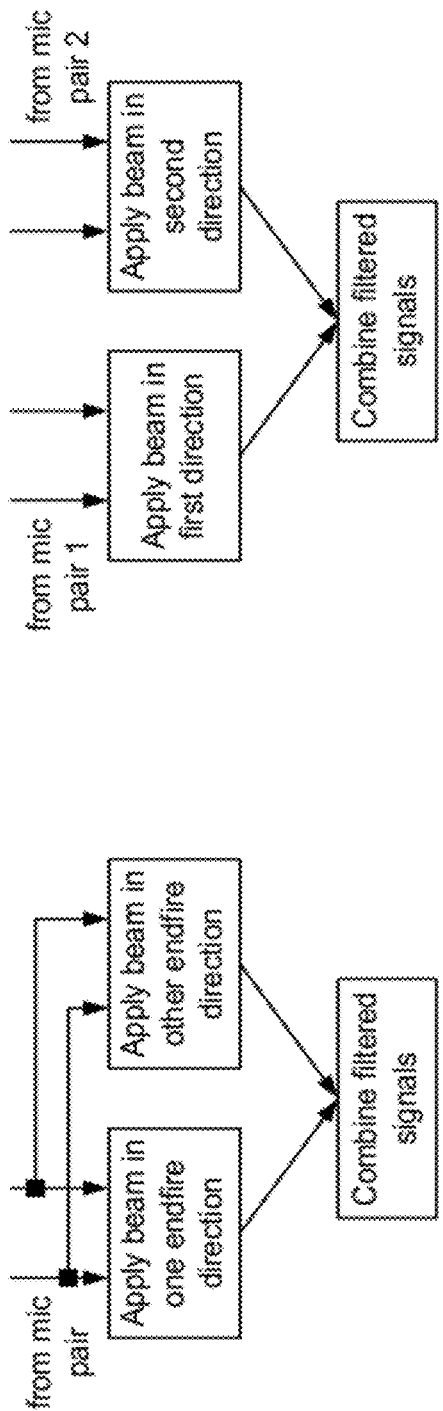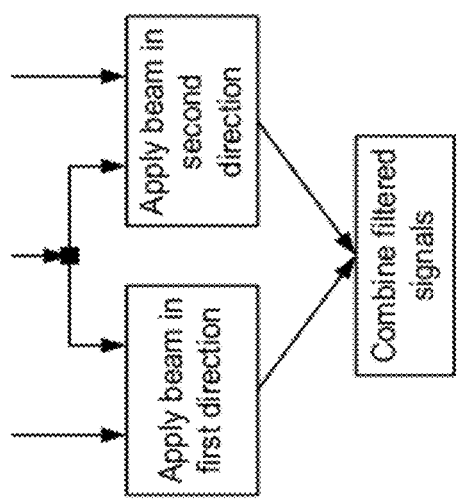
FIG. 23A  FIG. 23B  FIG. 23C

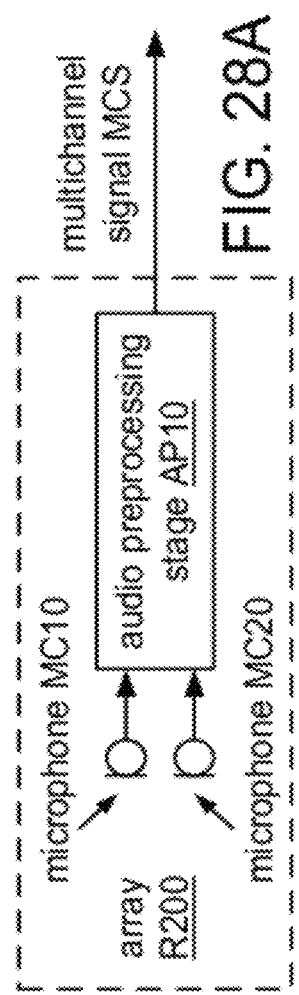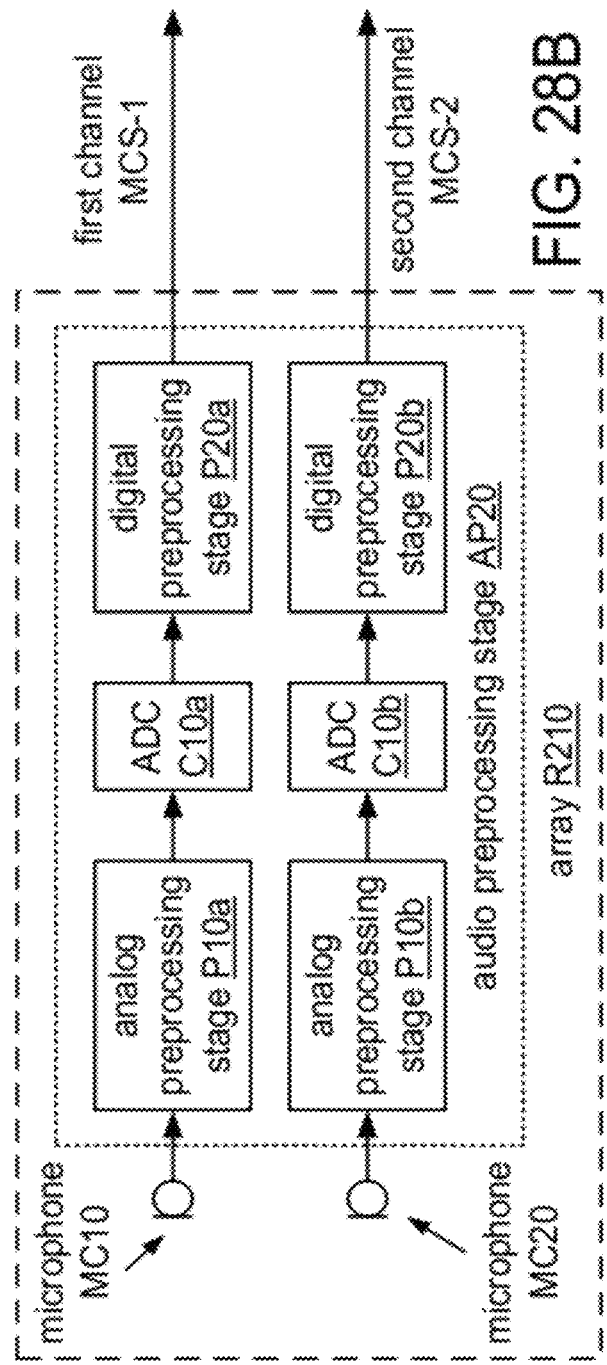

US 9,552,840 B2

THREE-DIMENSIONAL SOUND CAPTURING AND REPRODUCING WITH MULTI-MICROPHONES

CLAIM OF PRIORITY UNDER 35 U.S.C. §119

The present Application for Patent claims priority to Provisional Application No. 61/406,396, entitled "THREE-DIMENSIONAL SOUND CAPTURING AND REPRODUCING WITH MULTI-MICROPHONES," filed Oct. 25, 2010, and assigned to the assignee hereof. The present Application for Patent also claims priority to Provisional Application No. 61/466,432, entitled "MULTI-MICROPHONE SETUP AND PROCESSING SCHEME FOR WIDE STEREO AND SURROUND SOUND RECORDING," filed Mar. 22, 2011, and assigned to the assignee hereof.

BACKGROUND

Field

This disclosure relates to audio signal processing.

SUMMARY

A method of audio signal processing according to a general configuration includes decomposing a recorded auditory scene into a first category of localizable sources and a second category of ambient sound, and recording an indication of the directions of each of the localizable sources. Computer-readable storage media (e.g., non-transitory media) having tangible features that cause a machine reading the features to perform such a method are also disclosed. An apparatus for audio signal processing according to a general configuration includes means for decomposing a recorded auditory scene into a first category of localizable sources and a second category of ambient sound, and means for recording an indication of the directions of each of the localizable sources. An apparatus for audio signal processing according to another general configuration includes a spatially selective filter configured to decompose a recorded auditory scene into a first category of localizable sources and a second category of ambient sound, and a direction estimator configured to record an indication of the directions of each of the localizable sources.

BRIEF DESCRIPTION OF THE DRAWINGS

FIG. 18 shows examples of null beams for an approach as illustrated in FIG. 16.

FIG. 23A shows a flowchart of a method of combining endfire beams.

FIG. 23B shows a flowchart of a method for a general dual-pair case.

FIG. 23C shows an implementation of the method of FIG. 23B for a three-microphone case.

FIG. 28A shows a block diagram of an implementation R200 of array R100.

FIG. 28B shows a block diagram of an implementation R210 of array R200.

DETAILED DESCRIPTION

Figure 1:
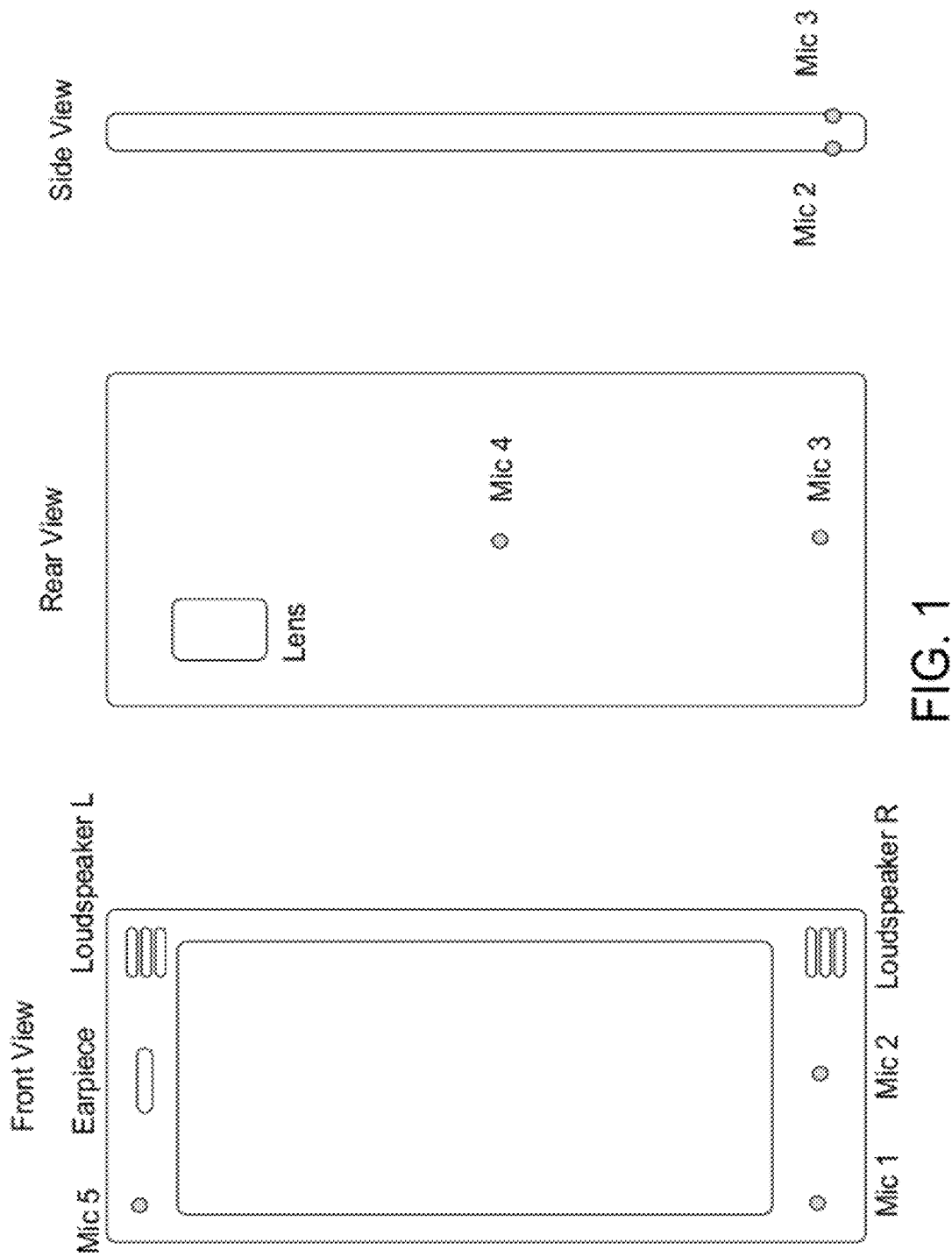
FIG. 1 shows a microphone placement on a representative handset for cellular telephony.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

A method as described herein may be configured to process the captured signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the signal is divided into a series of nonoverlapping segments or "frames", each having a length of ten milliseconds. A segment as processed by such a method may also be a segment (i.e., a "subframe") of a larger segment as processed by a different operation, or vice versa.

Nowadays we are experiencing prompt exchange of individual information through rapidly growing social network services such as Facebook, Twitter, etc. At the same time, we also see the distinguishable growth of network speed and storage, which already supports not only text, but also multimedia data. In this environment, we see an important need for capturing and reproducing three-dimensional (3D) audio for more realistic and immersive exchange of individual aural experiences.

Three-dimensional audio reproducing has been performed either using headphones or a loudspeaker array. However, there is no on-line controllability, such that the robustness of reproducing an accurate sound image is limited. In the case of headphone reproduction based on a head-related transfer function (HRTF), the sound image is typically localized within the user's head, such that the depth and spaciousness perception may be limited.

Multi-microphone-based audio processing algorithms have recently been developed in the context of enhancing speech communication. This disclosure describes several unique features for 3D audio based on a multi-microphone topology that may be combined with one or more such algorithms. These features are described below from a recording perspective and from a reproduction perspective.

These features may be used to support a whole path of 3D audio, with sub-categorized features listed below. The recording perspective deals with directional capturing for transmitting the monaural audio channels, which are used for reproducing along with the direction information. The reproduction perspective introduces methods of robust and faithful sound image reconstruction, again with multi-microphone topology.

FIG. 1 shows three different views of a device having a configurable microphone array geometry for different sound source directions. Depending on the use case, different combinations (e.g., pairs) of the microphones of the device may be selected to support spatially selective audio recording in different source directions. For example, referring to FIG. 1, in a videocamera situation (e.g., with the camera lens in the rear face of the device), a front-back microphone pair (for example, microphones 2 and 4, microphones 2 and 3, microphones 5 and 4) can be used to record front and back directions (i.e., to steer beams into and away from the camera point direction), with left and right direction preferences that may be manually or automatically configured. For sound recording in a direction that is orthogonal to the front-back axis, microphone pair (1, 2) is another option.

Figure 2B:
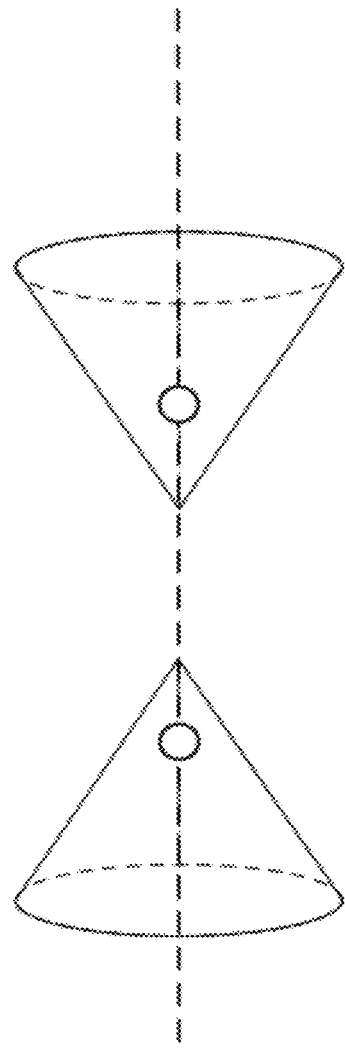
FIG. 2B illustrates regions of spatial selectivity for a microphone pair.
Figure 2A:
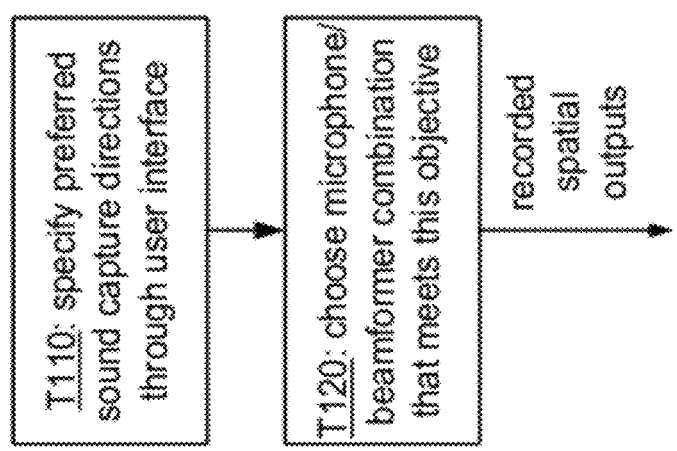
FIG. 2A shows a flowchart for a method of microphone/beamformer selection based on user interface inputs.
Figure 3:
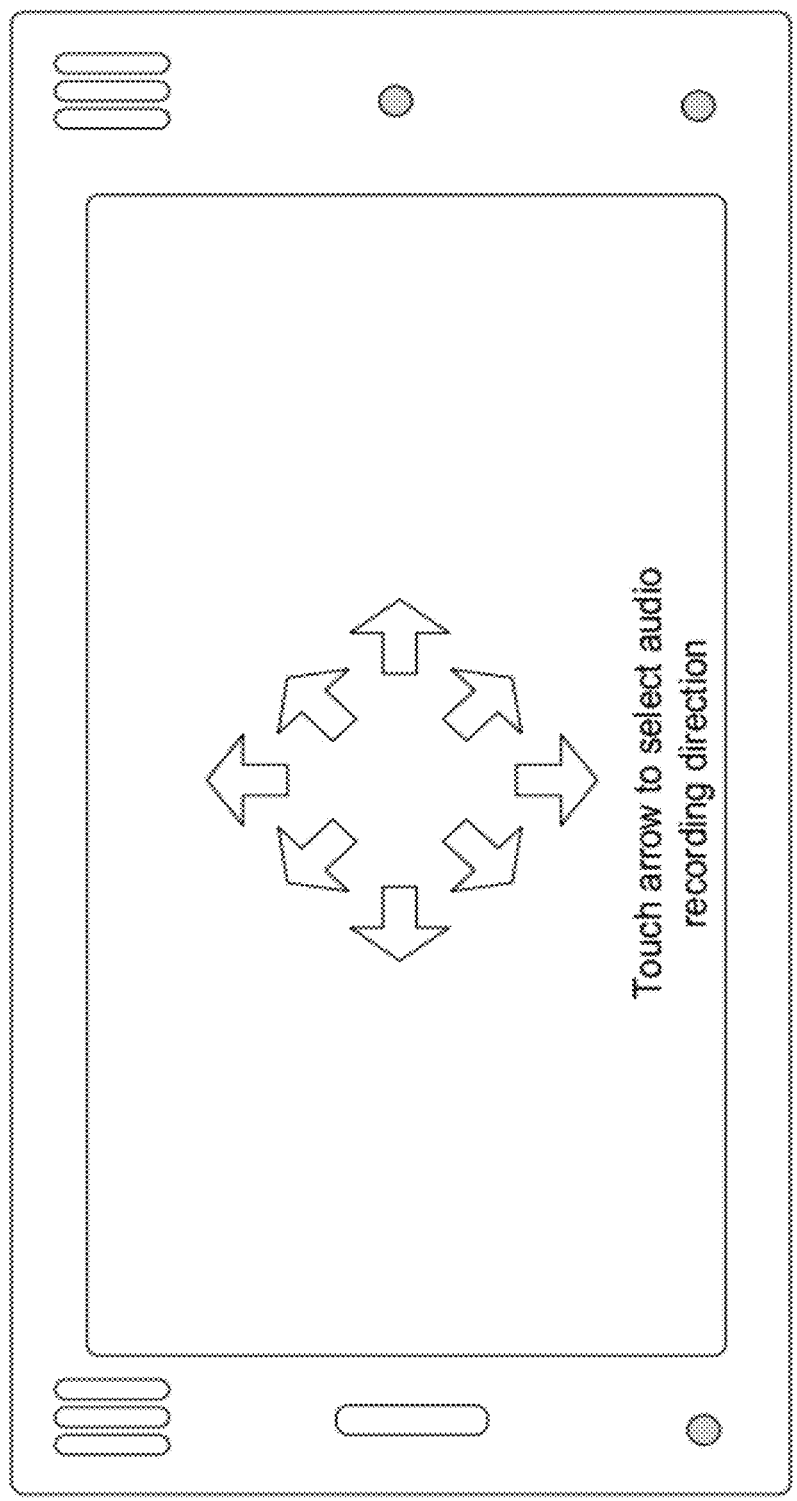
FIG. 3 illustrates a user interface for selecting a desired recording direction in two dimensions.

Different beamformer databanks can be computed offline for various microphone combinations given a range of design methods (i.e., MVDR, LCMV, phased arrays, etc.). During use, a desired one of these beamformers may be selected through a menu in the user interface depending on current use case requirements. FIG. 2A shows a conceptual flowchart of such a method that includes tasks T110 and T120. Task T110 specifies one or more preferred sound capture directions (e.g., as selected automatically and/or via a user interface), and task T120 selects a combination of a beamformer and a microphone array (e.g., pair) that provides the specified directivity. FIG. 2B illustrates regions of spatial selectivity for a microphone pair. FIG. 3 shows an example of a user interface to select a recording direction.

Figure 4:
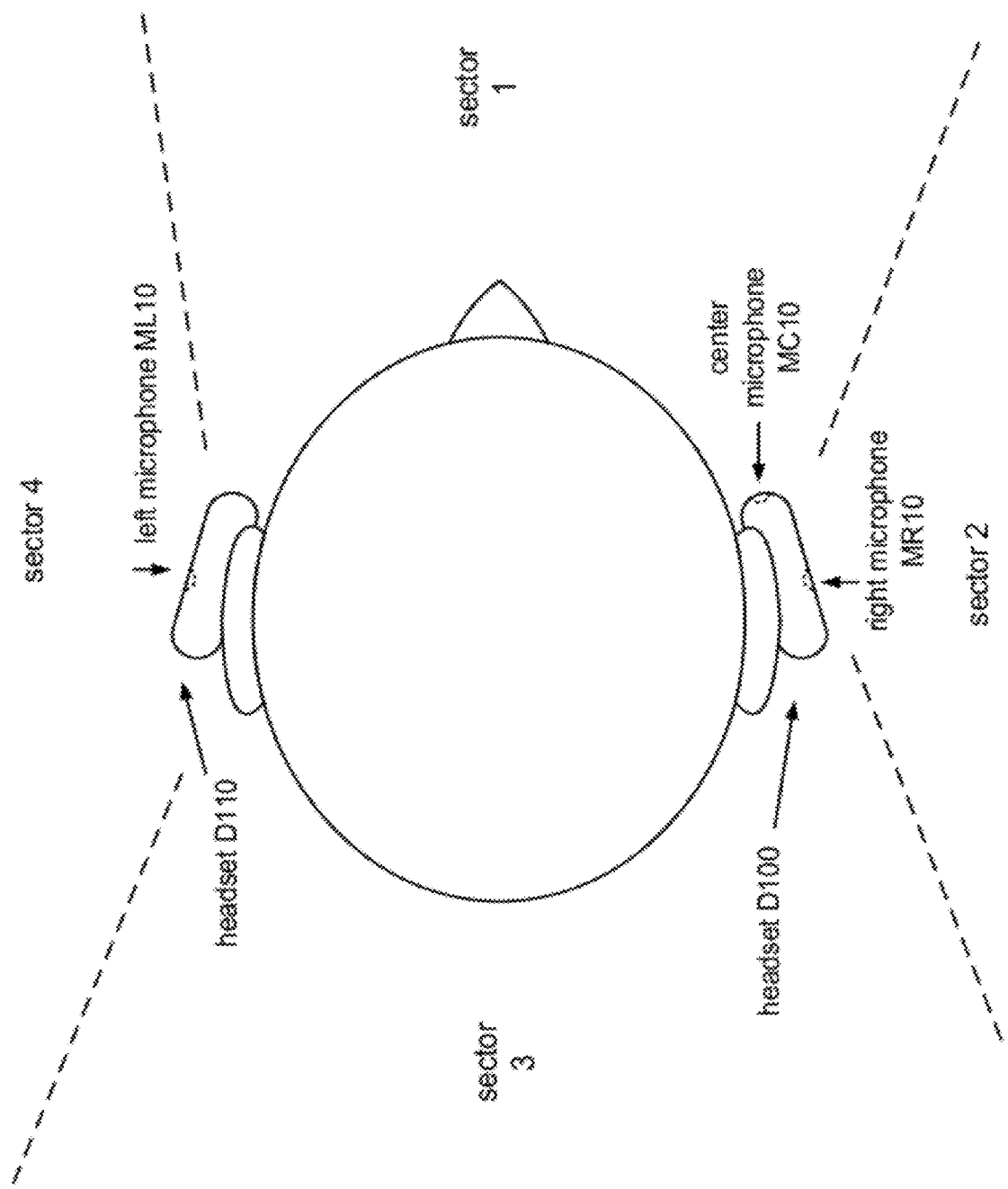
FIG. 4 shows possible spatial sectors defined around a headset that is configured to perform active noise cancellation (ANC).

FIG. 4 shows an illustration of a related use case for a stereo headset D100, D110 that includes three microphones that support applications such as voice capture and/or active noise cancellation (ANC). For such an application, different sectors around the head can be defined for recording using this three-microphone configuration (FIG. 4, using omnidirectional microphones).

Figure 5:
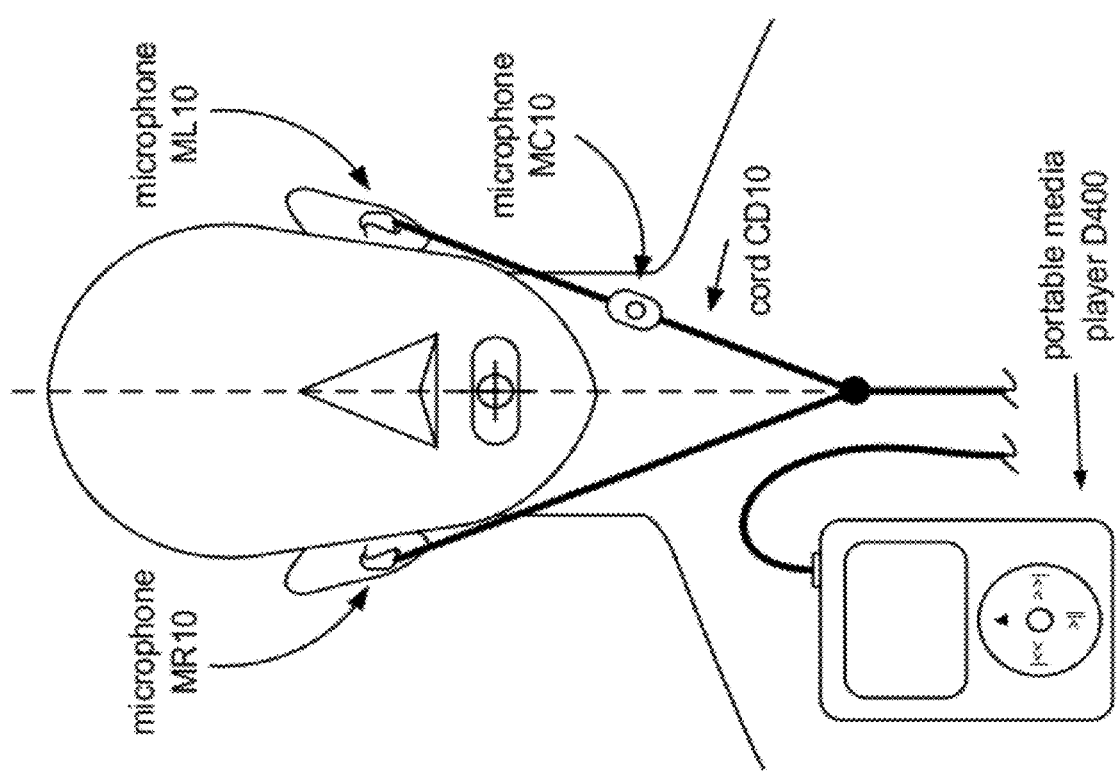
FIG. 5 shows a three-microphone arrangement.

Three-dimensional audio capturing may also be performed with specialized microphone setups, such as a three-microphone arrangement as shown in FIG. 5. Such an arrangement may be connected via a cord CD10 or wirelessly to a recording device, such as a video recording device D400. Device D400 may include an apparatus as described herein for detection of device orientation and selection of a pair among microphones ML10, MR10, and MC10 according to a selected audio recording direction. In an alternative arrangement, microphone MC 10 is located on the recording device.

It may be desirable to provide a capability of automatic scene analysis and decomposition. Such capability may be desirable for a case in which the user of the device has not specified a preferred audio recording direction, or such knowledge is otherwise unavailable.

In one example of automated scene analysis and decomposition, the auditory scene is decomposed into two main categories. The first main category is localizable sources. Signal components from such sources may be captured using suitable beamformers, which may be designed (e.g., calculated offline) and selected according to respective estimated directions of arrival. Recording of each localizable source may include recording a direction of arrival of the source and a corresponding monophonic audio signal. During reproduction of the recorded signal, these sources may be synthesized with the appropriate directional information.

Estimation of direction of arrival (DOA) may be performed by comparing the outputs, in response to the scene being recorded, of beamformers that are oriented in known directions. Additionally or alternatively, a direction estimator may be configured to calculate phase differences between corresponding frequency components of one or more pairs of microphone channels (where direction of arrival is indicated by a ratio between phase difference and frequency). Additionally or alternatively, a direction estimator may be configured to calculate a difference between the levels (e.g., an energy difference) of one or more pairs of microphone channels.

The localized source signals may be reproduced separately or in combination. For a case in which the spatialized monophonic sources are to be mixed eventually at the reproduction side, a separation requirement may be relaxed. For example, suppression of the other directional source or sources by as little as six dB during recording may be deemed to provide a sufficient degree of separation.

The second main category is captured unlocalizable ambient. Such an ambient may be obtained as a residual by, for example, subtracting the components from the localized sources from the recorded signal. The ambient signal may be processed further with surround loudspeakers in the reproduction side or may be diffused in the case of headphone listening.

Figure 6:
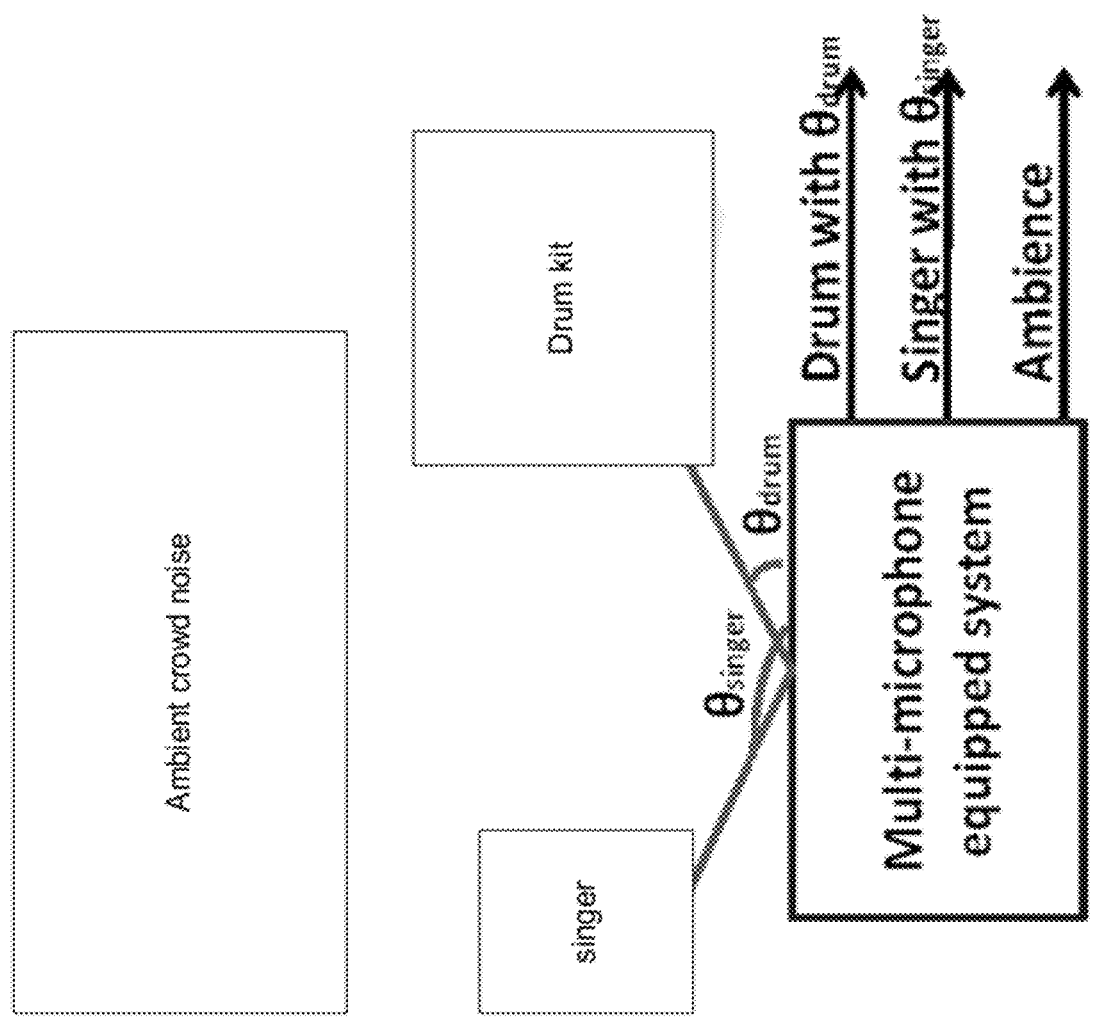
FIG. 6 shows a conceptual diagram for a case of two localizable sources (singer and drum) and an unlocalized ambient.

Such automated analysis and decomposition may be guided by a user-defined number of dominant sources to be localized in the scene. If a desired number of dominant sources is not available, however, it may also be determined automatically (e.g., based on analysis of direction of arrival information). FIG. 6 shows a conceptual diagram of two localizable sources (a singer and a drum) located at different directions of arrival θ with respect to the microphone array.

Figure 7:
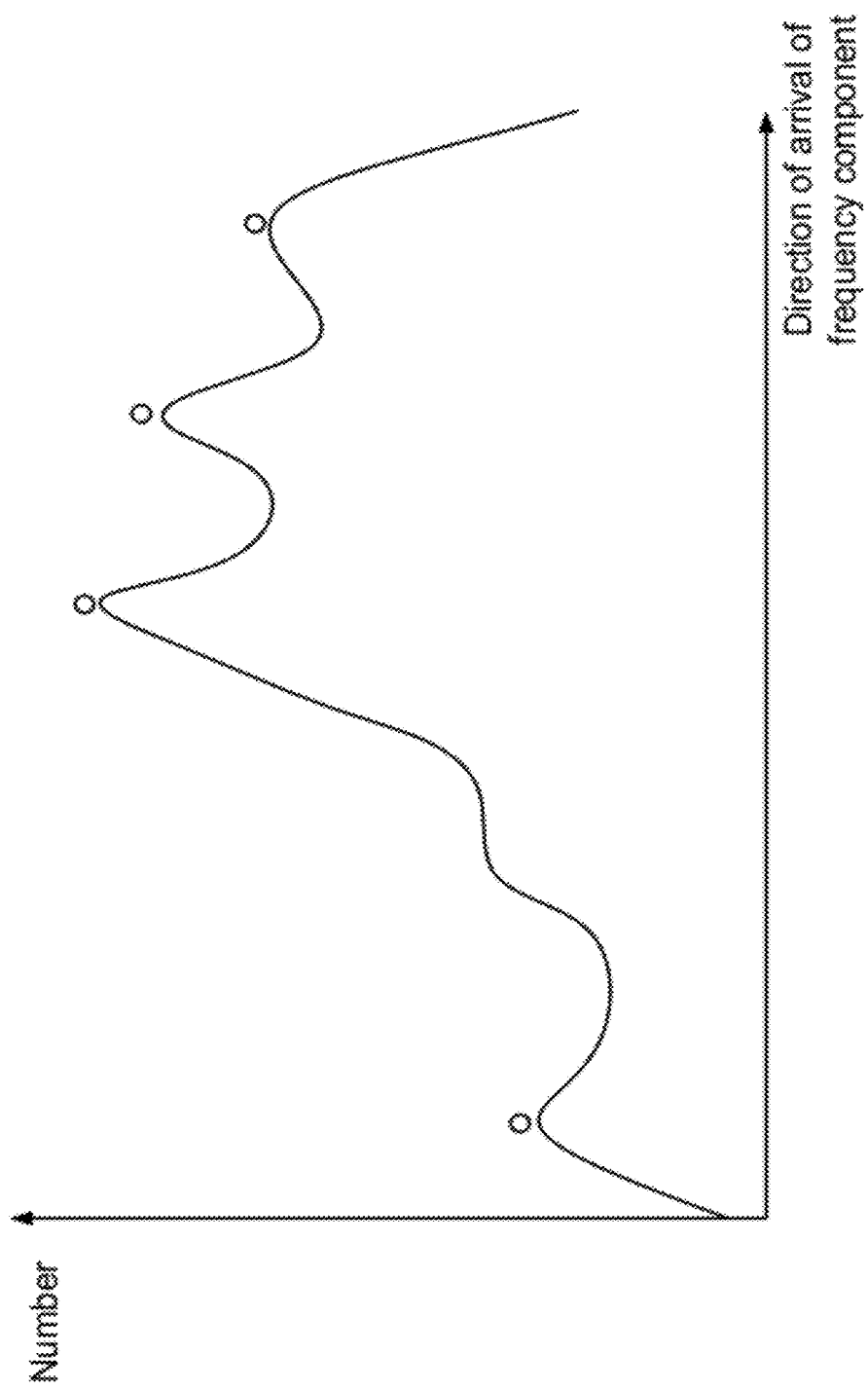
FIG. 7 shows an example of using a distribution of phase differences to estimate source direction and/or number.
Figure 8:
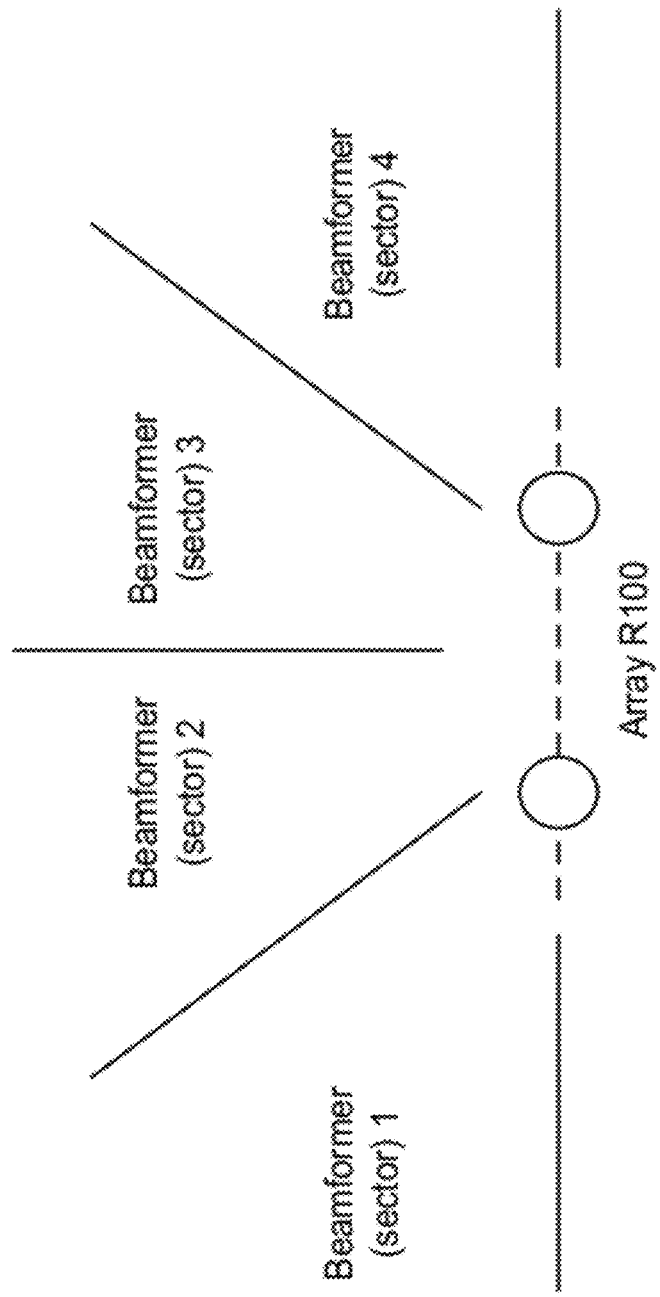
FIG. 8 shows an example of using multiple beamformers to estimate source direction and/or number.

In one example (e.g., as shown in FIG. 7), the number of localized sources is calculated according to the number of peaks in a histogram that indicates the number of frequency components arriving from each direction over a range of frequencies. In another example (e.g., as shown in FIG. 8), the number of localized sources is calculated according to the number of beamformers, among a set of beamformers oriented in different directions, whose outputs in response to the scene being recorded are above (alternatively, at least equal to) a threshold value.

It is generally assumed that a far-end user listens to recorded spatial sound using a stereo headset (e.g., an adaptive noise cancellation or ANC headset). In other applications, however, a multi-loudspeaker array capable of reproducing more than two spatial directions may be available at the far end. To support such a use case, it may be desirable to enable more than one microphone/beamformer combination at the same time during recording.

A multi-microphone array may be used with a spatially selective filter to produce a monophonic sound for each of one or more source directions. However, such an array may also be used to support spatial audio encoding in two or three dimensions. Examples of spatial audio encoding methods that may be supported with a multi-microphone array as described herein include 5.1 surround, 7.1 surround, Dolby Surround, Dolby Pro-Logic, or any other phase-amplitude matrix stereo format; Dolby Digital, DTS or any discrete multi-channel format; and wavefield synthesis. One example of a five-channel encoding includes Left, Right, Center, Left surround, and Right surround channels.

Figure 9:
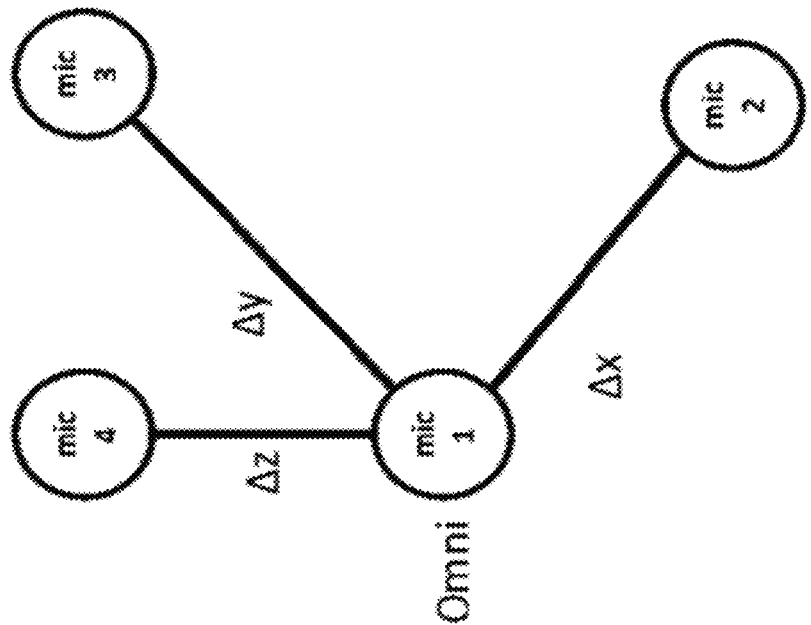
FIG. 9 shows an omnidirectional and first-order capturing for spatial coding using a four-microphone setup.

Examples of spatial audio encoding methods that may be supported with a multi-microphone array as described herein also include methods which may originally be intended for use with a special microphone, such as the Ambisonic B format or a higher-order Ambisonic format. The processed multichannel outputs of an Ambisonic encoding scheme, for example, are a three-dimensional Taylor expansion on the measuring point, which can be approximated at least up to first-order using a three-dimensionally located microphone array as depicted in FIG. 9. With more microphones, we may increase the approximation order.

In order to convey an immersive sound experience to the user, surround sound recordings are typically made stand-alone or in conjunction with videotaping. Surround sound recording generally requires a separate microphone setup using uni-directional microphones, which typically need to be clipped on separately and are thus not suitable for portable audio sensing devices (e.g., smartphones or tablets). In this disclosure, an alternative scheme based on multiple omnidirectional microphones combined with spatial filtering is presented. The solution is based on omnidirectional microphones embedded on the smartphone or tablet to support multiple use cases. Hence no bulky uni-directional microphone setups are required to support videotaping applications.

Two microphones for wide stereo, and at least three omnidirectional microphones with appropriate microphone axes for surround sound, are used to record multiple sound channels on the smartphone or tablet device. These channels are in turn processed in pairs or filtered all at the same time with filters designed to have specific spatial pickup patterns in desired look directions. Due to spatial aliasing, the inter-microphone distances may be chosen so the patterns are effective in the most relevant frequency bands. The generated stereo or 5.1 output channels can be played back in a surround sound setup to generate the immersive sound experience.

Figure 10:
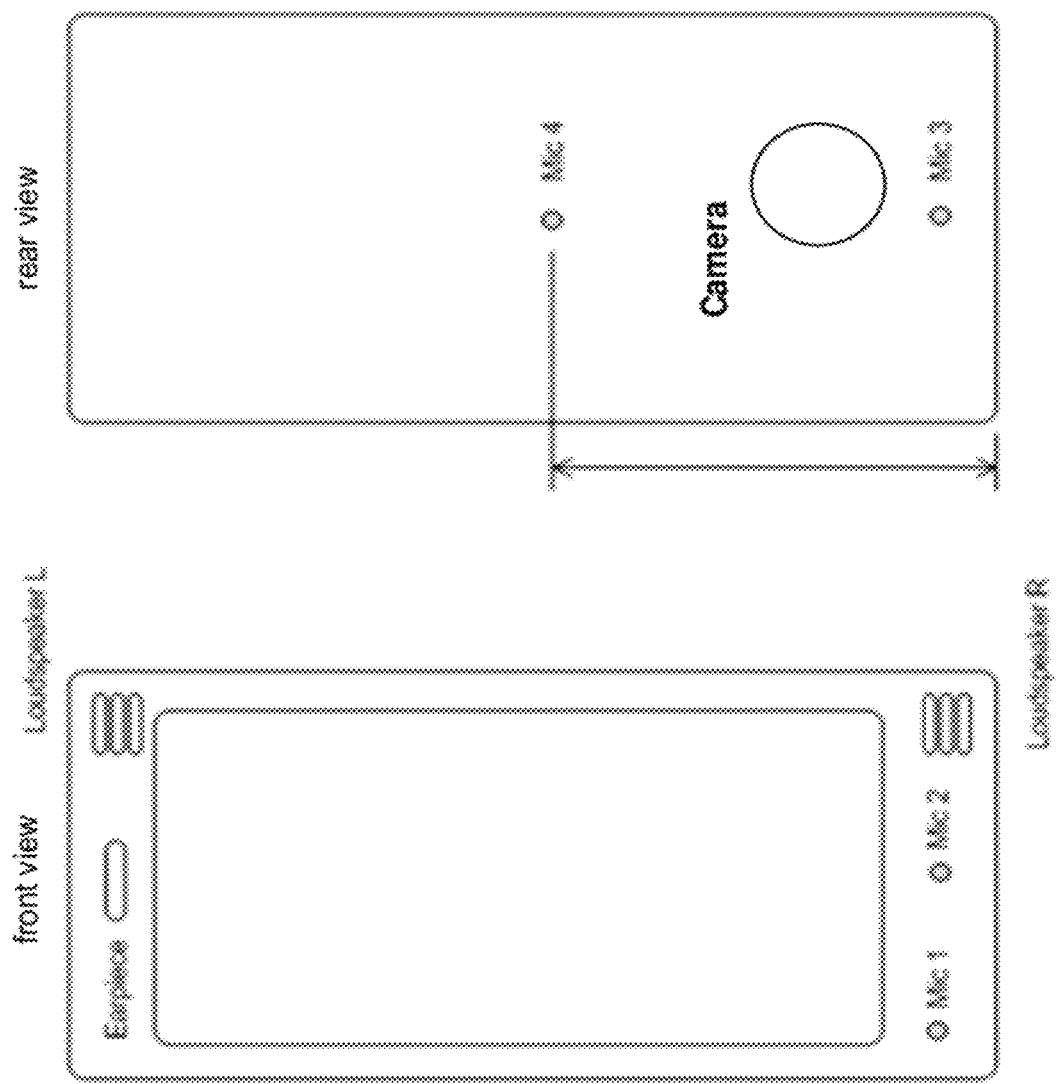
FIG. 10 shows front and rear views of one example of a portable communications device.

FIG. 10 shows front and rear views of one example of a portable communications device (e.g., a smartphone). The array of front microphone 2 and rear microphone 4 is one typical dual-microphone configuration that may be used to make a stereo recording, and several other pair arrays (e.g., (1,2), (3,4), (1,4)) are also possible. The different locations of the microphones relative to the source, which may depend on the holding position of the device, create a stereo effect that may be emphasized using spatial filtering. In order to create a stereo image between a commentator and a scene being recorded (e.g., during videotaping), it may be desirable to use the end-fire pairing using front microphone 2 and back microphone 4 with the distance of the thickness of the device (as shown in the side view of FIG. 1). However, note that we can also use the same microphones in a different holding position to create an end-fire pairing with the distance toward the z-axis (as shown in the rear view of FIG. 1). In the latter case, we can create a stereo image toward the scene (e.g., sound coming from left in the scene is captured as left-coming sound).

Figure 11:
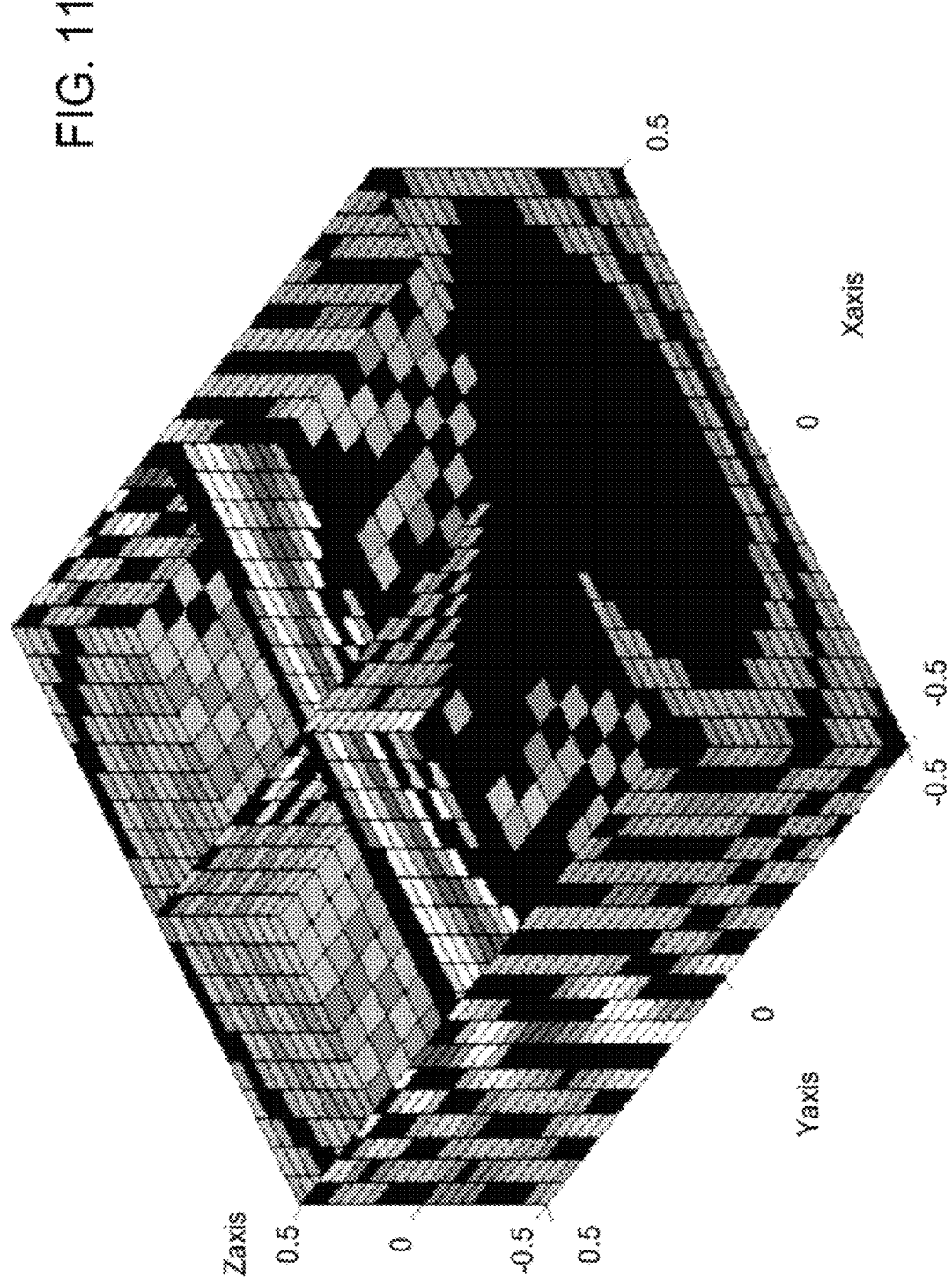
FIG. 11 shows a case of recording a source signal arriving from a broadside direction.

FIG. 11 shows a case of using the end-fire pairing of front microphone 2 and back microphone 4 with the distance of the thickness of the device to record a source signal arriving from a broadside direction. In this example, the coordinates of the two microphones are (x=0, y=0, z=0) and (x=0, y=0.10, z=−0.01). Stereo beamforming is applied, such that the area along the y=0 plane shows the beam in the broadside direction and the area around (x=0, y=−0.5, z=0) shows the nullbeam in the endfire direction. When the commentator is talking from the broadside direction (e.g., into the rear face of the device), it may be difficult to distinguish the commentator's voice from sounds from a scene at the front face of the device, due to an ambiguity with respect to rotation about the axis of the microphone pair. The result is that a stereo effect to separate the commentator's voice from the scene is not enhanced.

Figure 12:
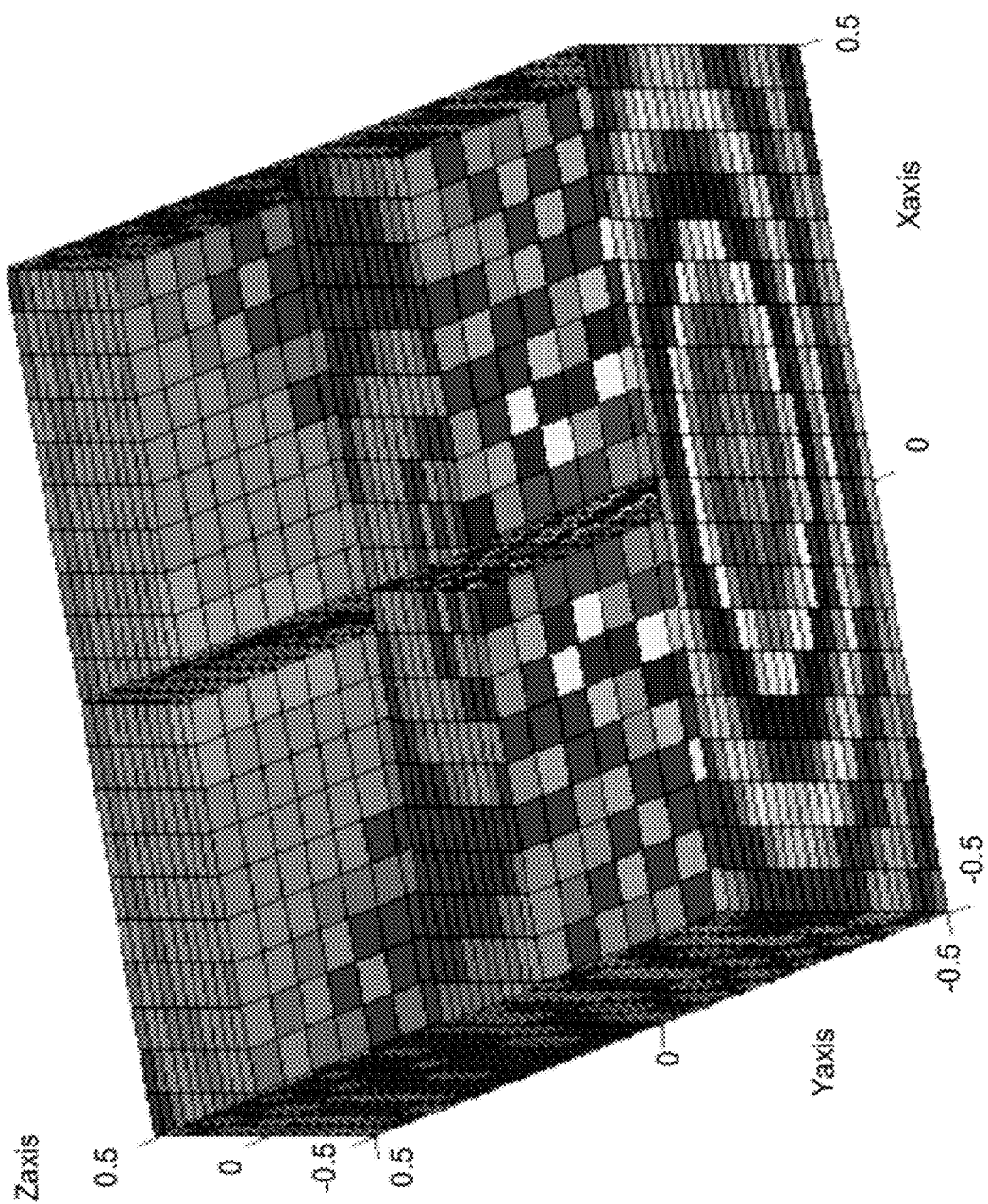
FIG. 12 shows another case of recording a source signal arriving from a broadside direction.

FIG. 12 shows another case of using the end-fire pairing of front microphone 2 and back microphone 4 with the distance of the thickness of the device to record a source signal arriving from a broadside direction, with the microphone coordinates being the same as in FIG. 11. In this example, the beam is oriented toward the endfire direction (through the point (x=0, y=−0.5, z=0)) such that the user's (e.g., commentator's) voice is nulled out in one channel. The beam may be formed using a null beamformer or another approach. A blind source separation (BSS) approach, for example, such as independent component analysis (ICA) or independent vector analysis (IVA), may provide a wider stereo effect than a null beamformer. Note that in order to provide a wider stereo effect for the taped scene itself, it may be sufficient to use the end-fire pairing of the same microphones with the distance toward z-axis (as shown in the rear view of FIG. 1).

Figure 13:
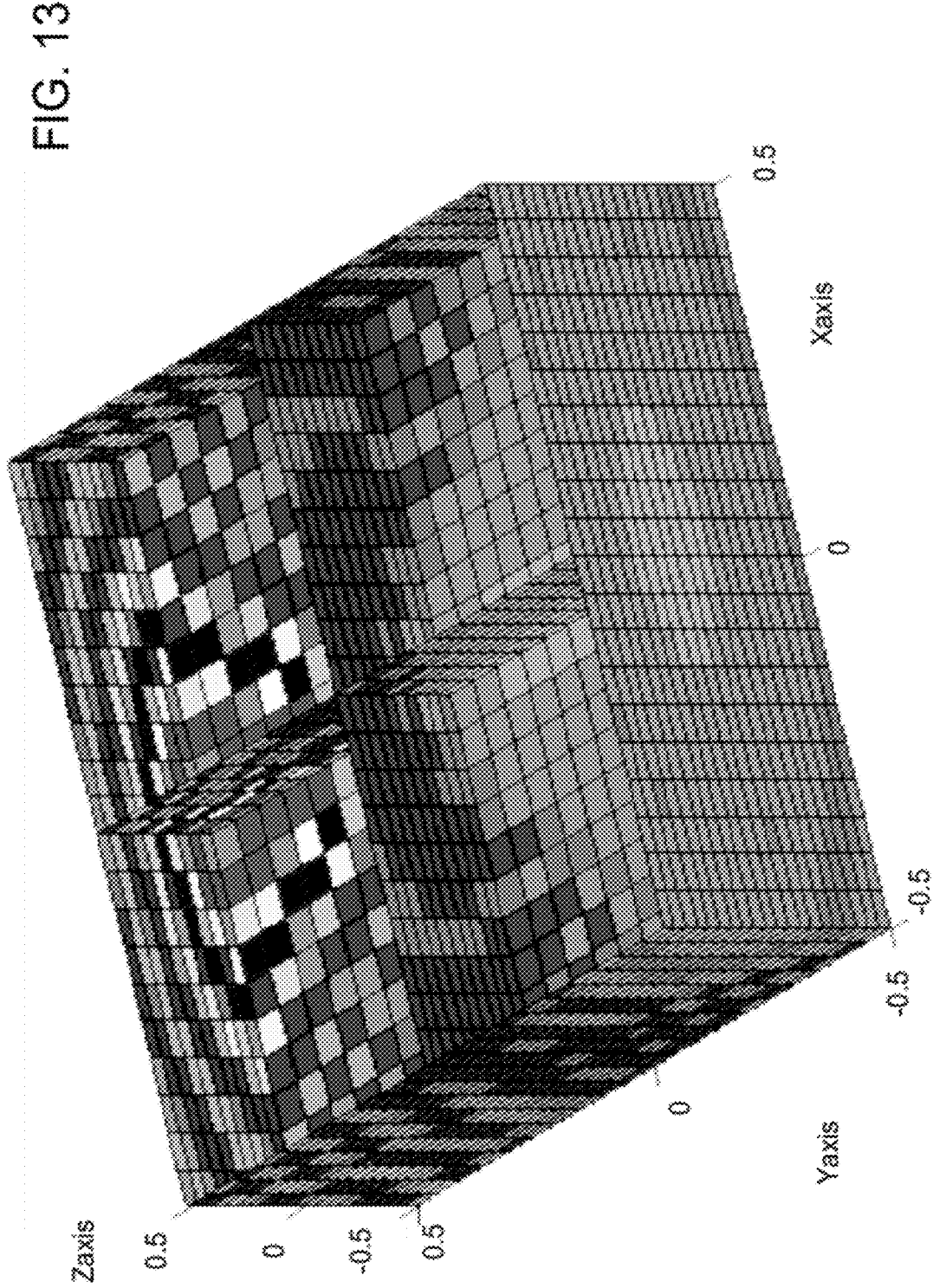
FIG. 13 shows a case of combining endfire beams.

With the device in a broadside holding position, it may be desirable to combine endfire beams to the left and right sides (e.g., as shown in FIGS. 12 and 13) to enhance a stereo effect as compared to the original recording. Such processing may also include adding an inter-channel delay (e.g., to simulate microphone spacing). Such a delay may serve to normalize the output delay of both beamformers to a common reference point in space. When stereo channels are played back over headphones, manipulating delays can also help to rotate the spatial image in a preferred direction. The device may include an accelerometer, magnetometer, and/or gyroscope that indicates the holding position (e.g., as described in U.S. patent application Ser. No. 13/280,211, entitled "SYSTEMS, METHODS, APPARATUS, AND COMPUTER-READABLE MEDIA FOR ORIENTATION-SENSITIVE RECORDING CONTROL"). FIG. 23A shows a flowchart of such a method.

When the device is in an endfire holding position, the recording may be expected already to provide a wide stereo effect. In this case, spatial filtering (e.g., using a null beamformer or a BSS solution, such as ICA or IVA) may enhance the effect only slightly.

In a dual-microphone case, a stereo recorded file may be enhanced through spatial filtering (e.g., to increase separation of the user's voice and the recorded scene) as described above. It may be desirable to generate several different directional channels from the captured stereo signal (e.g., for surround sound), such as to upmix the signal to more than two channels. For example, it may be desirable to upmix the signal to five channels (for a 5.1 surround sound scheme, for example) such that it may be played back using a different one of an array of five speakers for each channel. Such an approach may include applying spatial filtering in corresponding directions to obtain the upmixed channels. Such an approach may also include applying a multichannel encoding scheme to the upmixed channels (e.g., a version of Dolby Surround).

For a case in which more than two microphones are used for recording, it is possible to record in multiple directions (e.g., five directions, according to a 5.1 standard) using spatial filtering and different microphone combinations, then to play back the recorded signal (e.g., using five loudspeakers). Such processing may be performed without upmixing.

Figure 14:
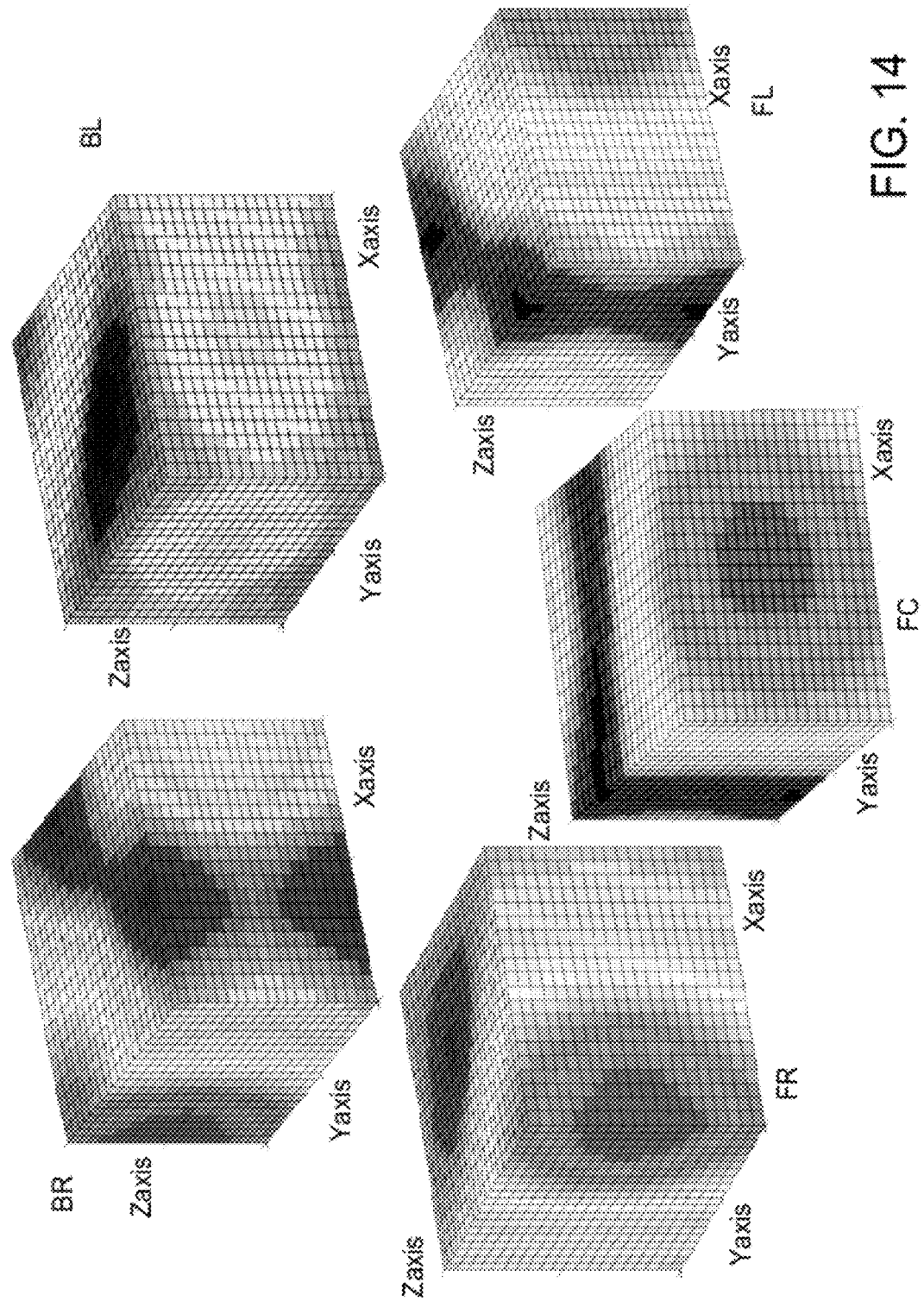
FIG. 14 shows examples of plots for beams in front center, front left, front right, back left, and back right directions.

FIG. 1 shows front, rear, and side views of one example of a portable communications device (e.g., a smartphone) having more than two microphones. It may be desirable to combine beams and/or null beams from different microphone pairs to obtain enhanced discrimination in particular look directions. One approach to multichannel recording includes designing two-dimensional beams in five different look directions using a front-back microphone pair (e.g., microphones 2 and 3) and a left-right microphone pair (e.g., microphones 1 and 2). FIG. 14 shows examples of plots for such beams in front center (FC), front left (FL), front right (FR), back left (BL), and back right (BR) directions. The X, Y, and Z axes are oriented similarly in all of these plots (the middle of each range is zero and the extremes are +/−0.5, with the X axis increasing to the right, the Y axis increasing toward the left, and the Z axis increasing toward the top), and the dark areas indicate beam or null beam directions as stated. The beams for each plot are directed through the following points (z=0): (x=0, y=+0.5) for FC, (x=+0.5, y=+0.5) for FR, (x=+0.5, y=−0.5) for BR, (x=−0.5, y=−0.5) for BL, and (x=−0.5, y=+0.5) for FL.

The effectiveness of a spatial filtering technique may be limited to a bandpass range depending on factors such as small inter-microphone spacing, spatial aliasing, and scattering at high frequencies. In one example, the signal is lowpass-filtered (e.g., with a cutoff frequency of 8 kHz) before spatial filtering.

Figure 15:
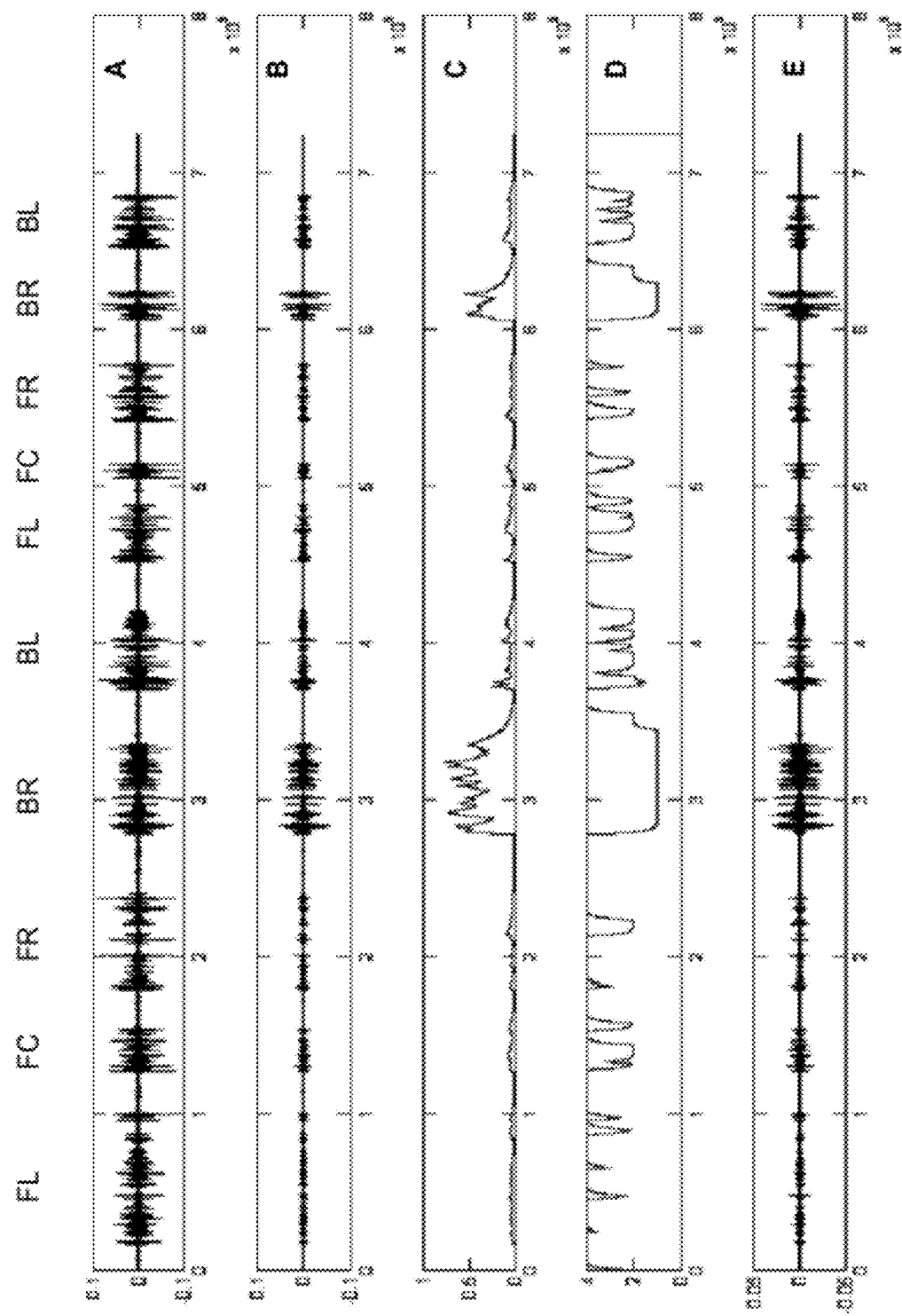
FIG. 15 shows an example of processing to obtain a signal for a back-right spatial direction.

For a case in which sound from a single point source is being captured, complementing such beamforming with masking of signals arriving from other directions may lead to strong attenuation of non-direct-path signals and/or audible distortion at the level of aggressiveness needed to achieve the desired masking effect. Such artifacts may be undesirable for high-definition (HD) audio. In one example, HD audio is recorded at a sampling rate of 48 kHz. To mitigate such artifacts, instead of using the aggressively spatially filtered signal, it may be desirable to use only the energy profile of the processed signal for each channel and to apply a gain panning rule according to the energy profile for each channel on the original input signals or spatially processed output before masking. Note that as sound events are typically very sparse in the time-frequency map, it is possible to use such a post-gain-panning method even with multiple-source cases. FIG. 15 shows an example of processing to obtain a signal for a back-right spatial direction. Plot A (amplitude vs. time) shows the original microphone recording. Plot B (amplitude vs. time) shows a result of lowpass-filtering the microphone signal (with a cutoff frequency of 8 kHz) and performing spatial filtering with masking. Plot C (magnitude vs. time) shows relevant spatial energy, based on energy of the signal in plot B (e.g., sum of squared sample values). Plot D (state vs. time) shows a panning profile based on energy differences indicated by the low-frequency spatial filtering, and plot E (amplitude vs. time) shows the 48-kHz panned output.

For a dual-mic-pair case, it may be desirable to design at least one beam for one pair and at least two beams in different directions for the other pair. The beams may be designed or learned (e.g., with a BSS approach, such as ICA or IVA). Each of these beams can be used to obtain a different channel of the recording (e.g., for a surround sound recording).

Figure 16:
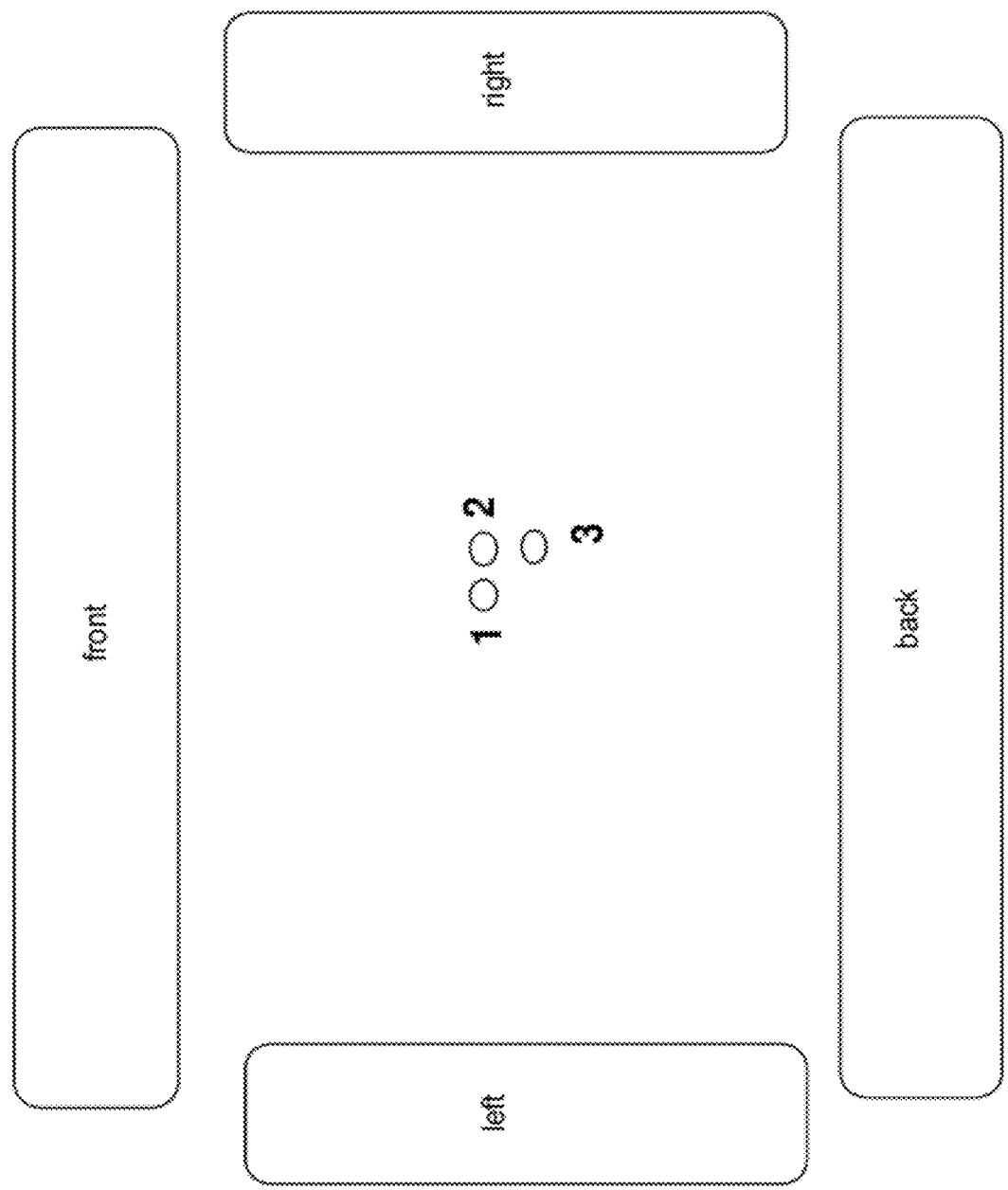
FIG. 16 shows a null beamforming approach using two-microphone-pair BSS with an array of three microphones.

FIG. 16 shows a null beamforming approach using two-microphone-pair BSS (e.g., ICA or IVA) with an array of three microphones. For front and back directions, the microphone pair (2,3) is used. For left and right directions, the microphone pair (1,2) is used. It may be desirable for the axes of the two microphone pairs to be orthogonal or at least substantially orthogonal (e.g., not more than five, ten, fifteen, or twenty degrees from orthogonal).

Figure 17:
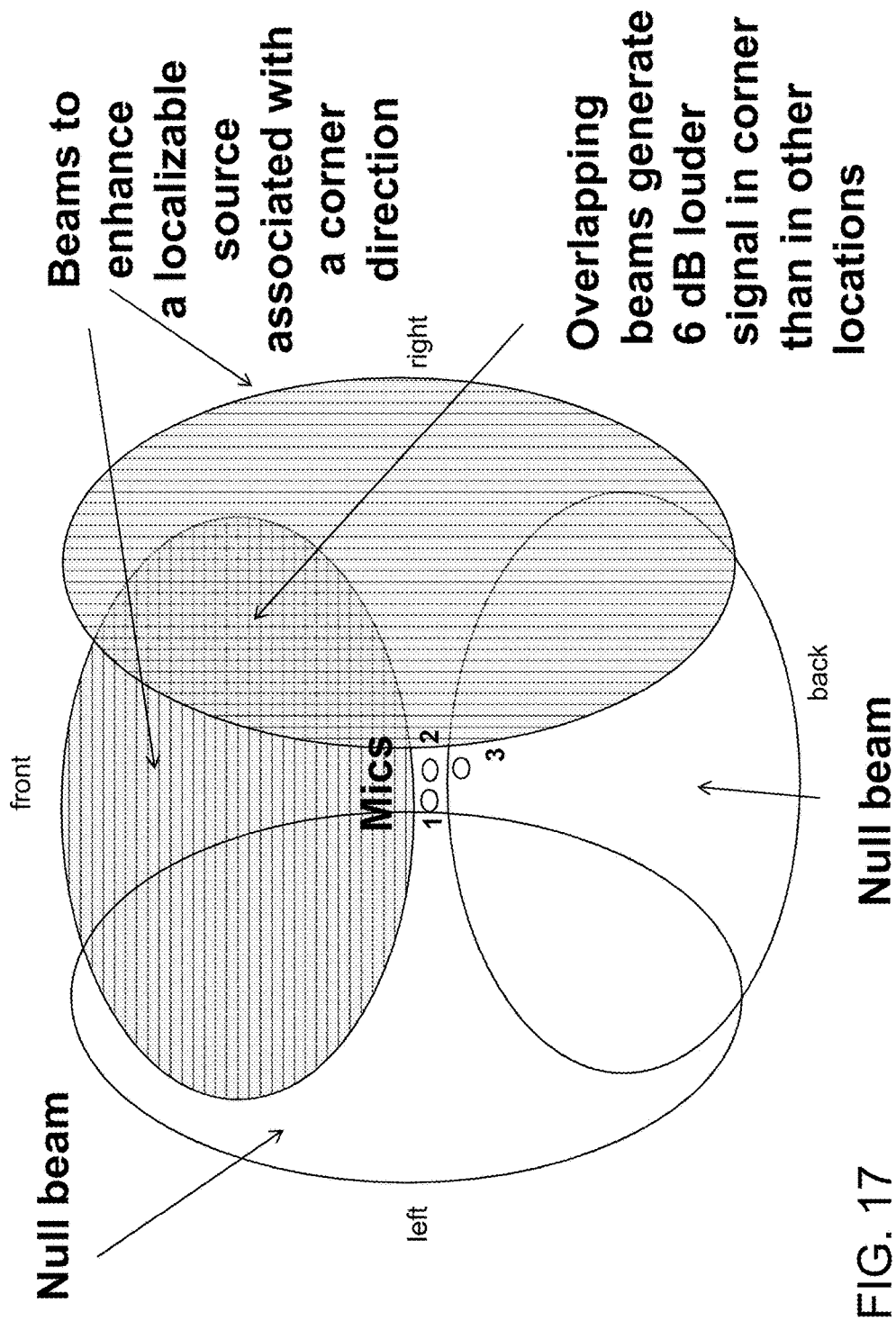
FIG. 17 shows an example in which beams in the front and right directions are combined to obtain a result for the front-right direction.

Some of the channels may be produced by combining two of more of the beams. FIG. 17 shows an example in which beams in the front and right directions are combined to obtain a result for the front-right direction. Results for the front-left, back-right, and/or back-left directions may be obtained in the same way. In this example, combining overlapping beams in such manner provides a signal that is six dB louder for signals arriving from the corresponding corner than for signals arriving from other locations. FIG. 23B shows a flowchart of such a method for a general dual-pair case. FIG. 23C shows an implementation of the method of FIG. 23B for a three-microphone case. It may be desirable to apply an inter-channel delay to normalize the output delay of both beamformers to a common reference point in space. When the "left-right end-fire pair" and the "front-back end-fire pair" are combined, it may be desirable to set the reference point to the center of gravity of the microphone array. Such an operation may support maximized beaming at the desired corner location with adjusted delay between the two pairs.

FIG. 18 shows examples of null beams for an approach as illustrated in FIG. 16, which may be designed using MVDR beamformers or converged BSS (e.g., ICA or IVA) filters learned on scenarios in which the relative positions of the device and the sound source (or sources) are fixed. In these examples, the range of frequency bins shown corresponds to the band of from 0 to 8 kHz. It may be seen that the spatial beampatterns are complementary. It may also be seen that, because of the different spacings between the microphones of the left-right pair and the microphones of the front-back pair in these examples, spatial aliasing affects these beampatterns differently.

Because of spatial aliasing, depending on the inter-microphone distances it may be desirable to apply the beams to less than the entire frequency range of the captured signals (e.g., to the range of from 0 to 8 kHz as noted above). After the low-frequency content is spatially filtered, the high-frequency content may be added back, with some adjustment for spatial delay, processing delay, and/or gain matching. In some cases (e.g., handheld device form factors), it may also be desirable to filter only a middle range of frequencies (e.g., only down to 200 or 500 Hz), as some loss of directivity may be expected anyway due to microphone spacing limitations.

If some kind of non-linear phase distortion exists (which is usually always the case), then a standard beam/null-forming technique that is based on the same delay for all frequencies according to the same DOA may perform poorly, due to differential delay on some frequencies as caused by the non-linear phase distortion. A method based on IVA as described herein operates on a basis of source separation, however, and such a method can therefore be expected to produce good results even in the presence of differential delay for the same DOA. Such robustness may be a potential advantage of using IVA for obtaining surround processing coefficients.

For a case in which no spatial filtering is done above some cutoff frequency (e.g., 8 kHz), providing the final HD signal may include high-pass filtering the original front/back channels and adding back the band of from 8 to 24 kHz. Such an operation may include adjusting for spatial and high-pass filtering delays. It may also be desirable to adjust the gain of the 8-24-kHz band (e.g., so as not to confuse the spatial separation effect). The examples illustrated in FIG. 15 were filtered in the time domain, although application of the approaches described herein to filtering in other domains (e.g., the frequency domain) is expressly contemplated and hereby disclosed.

Figure 19:
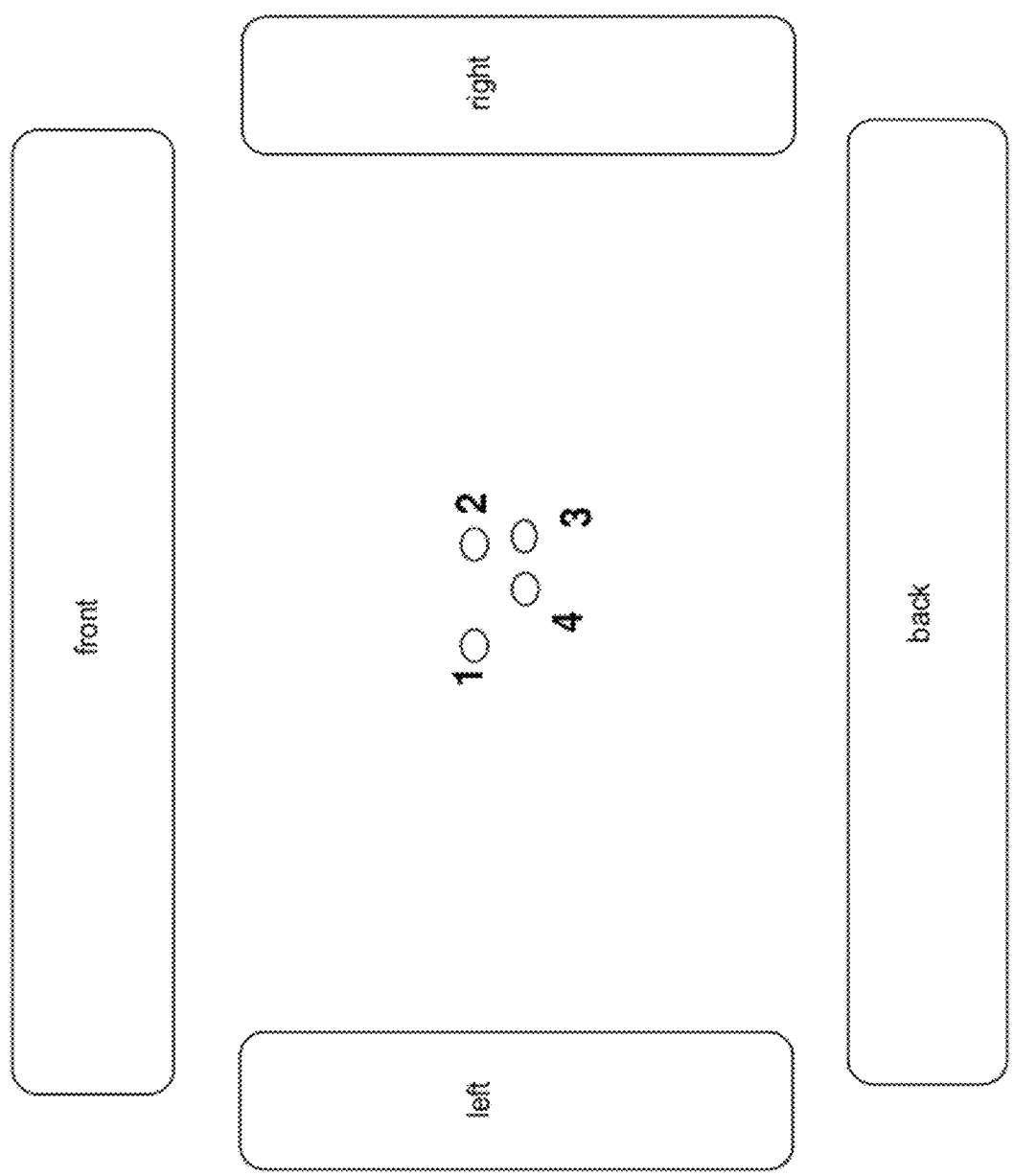
FIG. 19 shows a null beamforming approach using four-channel BSS with an array of four microphones.
Figure 24:
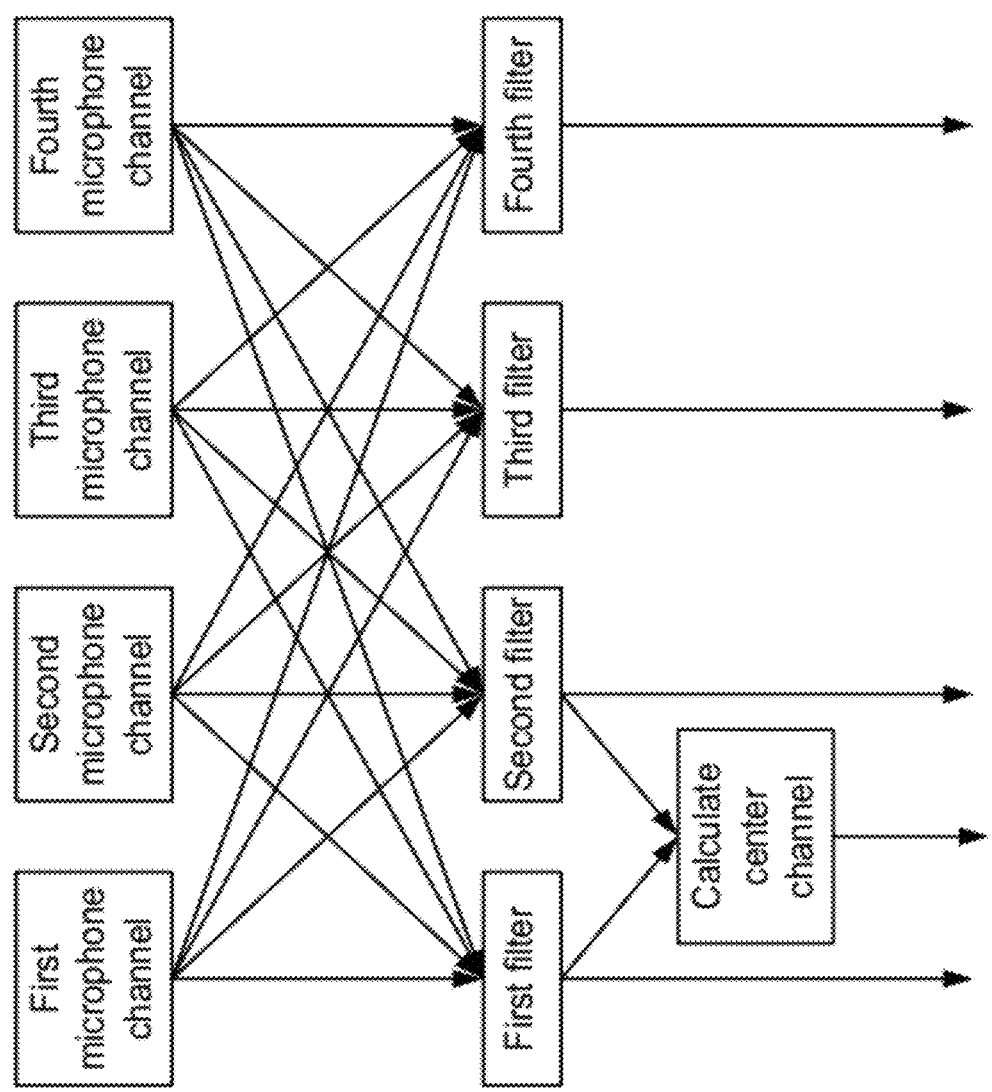
FIG. 24 shows a flowchart for a method of using four-channel BSS with an array of four microphones.
Figure 26:
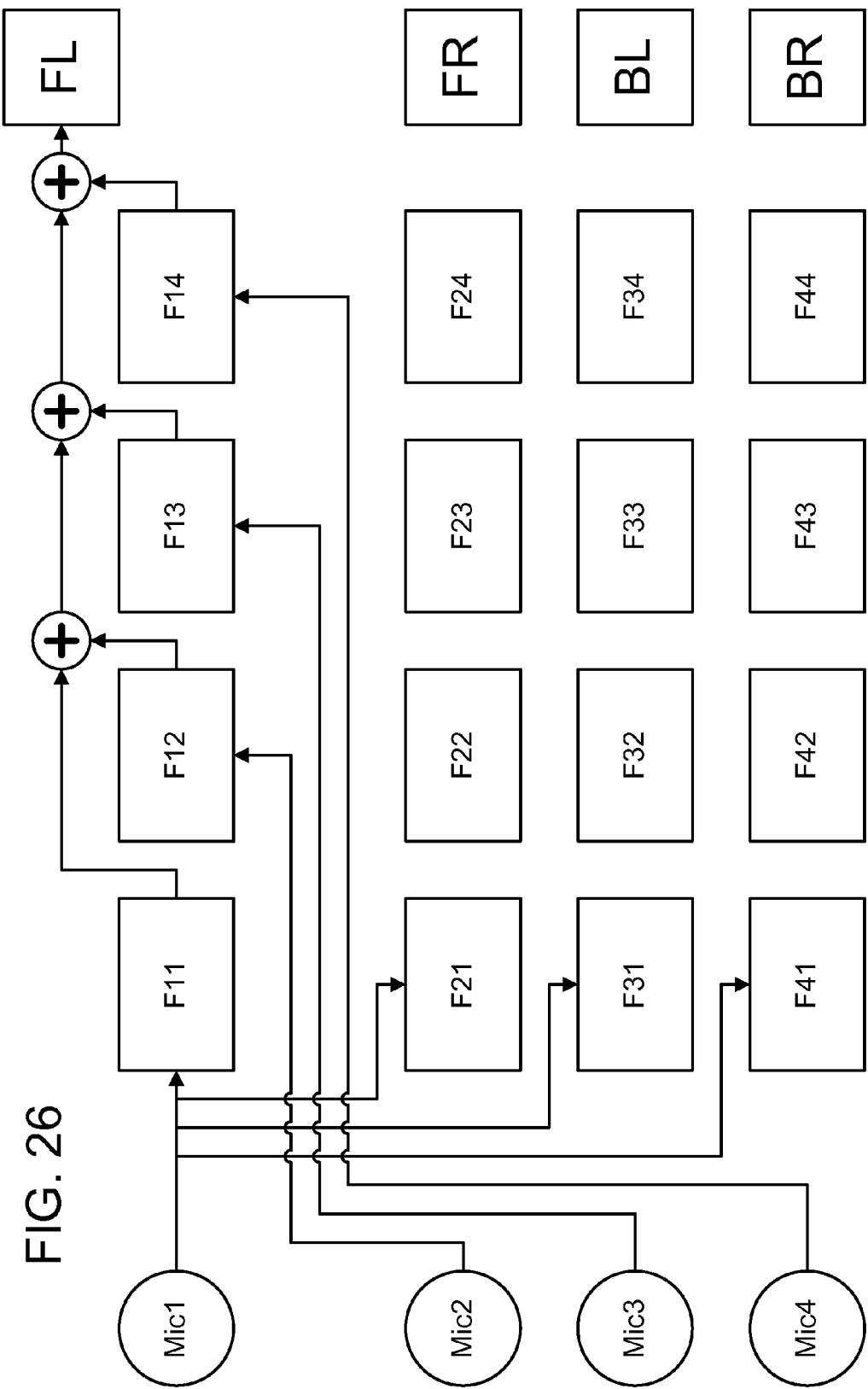
FIG. 26 shows a partial routing diagram for a BSS filter bank.
Figure 27:
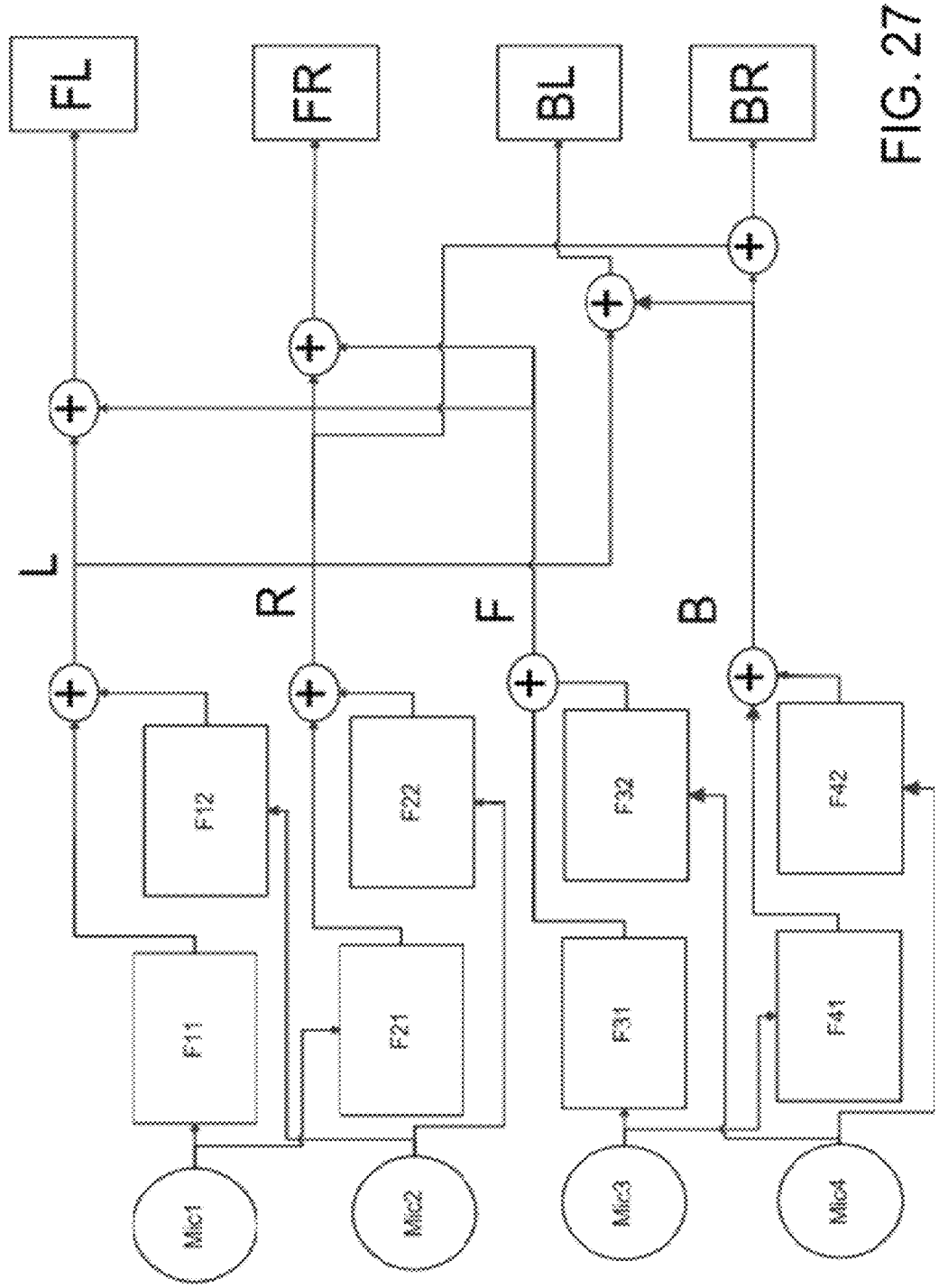
FIG. 27 shows a routing diagram for a 2×2 filter bank.

FIG. 19 shows a null beamforming approach using four-channel BSS (e.g., ICA or IVA) with an array of four microphones. It may be desirable for the axes of at least two of the various pairs of the four microphones to be orthogonal or at least substantially orthogonal (e.g., not more than five, ten, fifteen, or twenty degrees from orthogonal). Such four-microphone filters may be used in addition to dual-microphone pairing to create beampatterns into corner directions. In one example, the filters are learned using IVA and training data, and the resulting converged IVA filters are implemented as fixed filters applied to four recorded microphone inputs to produce signals for each of the respective five channel directions in 5.1 surround sound (FL,FC,FR,BR,BL). To exploit the five speakers fully, the front-center channel FC may be obtained, for example, using the following rule: $(FL+FR)/\sqrt{2}$. FIG. 24 shows a flowchart for such a method. FIG. 26 shows a partial routing diagram for such a filter bank, in which mic n provides input to filters in column n, for $1<=n<=4$, and each of the output channels is a sum of the outputs of the filters in the corresponding row. FIG. 27 shows a routing diagram for a 2×2 filter bank.

In one example of such a learning process, an independent sound source is positioned at each of four designated locations (e.g., the four corner locations FL, FR, BL, and BR) around the four-microphone array, and the array is used to capture a four-channel signal. Note that each of the captured four-channel outputs is a mixture of all four sources. A BSS technique (e.g., IVA) is then applied to separate the four independent sources. After convergence, we obtain the separated four independent sources as well as a converged filter set, which is essentially beaming toward the target corner and nulling toward the other three corners.

Figure 20:
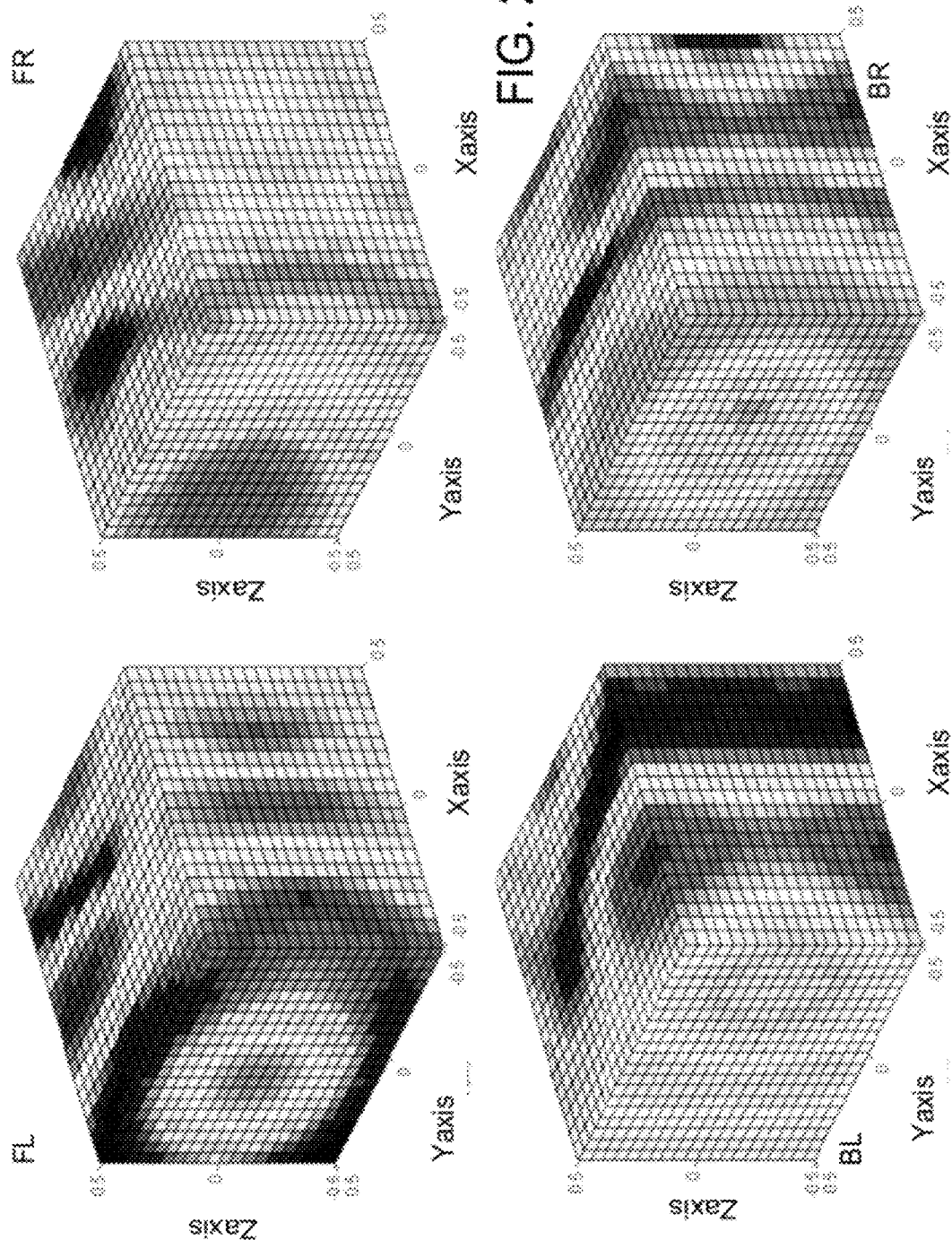
FIG. 20 shows examples of beam patterns for a set of four filters for the corner directions FL, FR, BL, and BR.

FIG. 20 shows examples of beam patterns for such a set of four filters for the corner directions FL, FR, BL, and BR.

For landscape recording mode, obtaining and applying the filters may include using two front microphones and two back microphones, running a four-channel IVA learning algorithm for a source at a fixed position relative to the array, and applying the converged filters.

Figure 21:
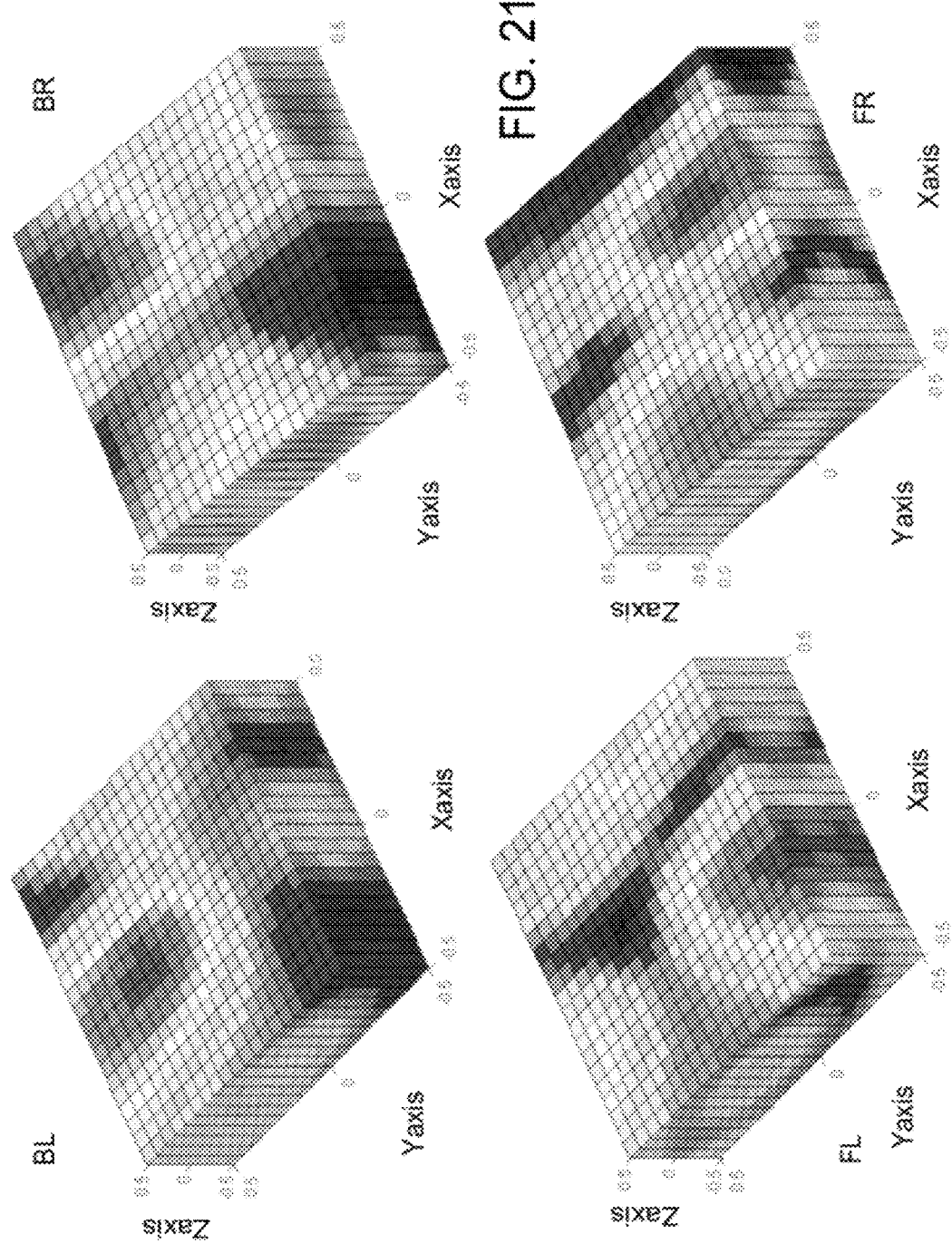
FIG. 21 shows examples of IVA converged filter beam patterns learned on mobile speaker data.
Figure 22:
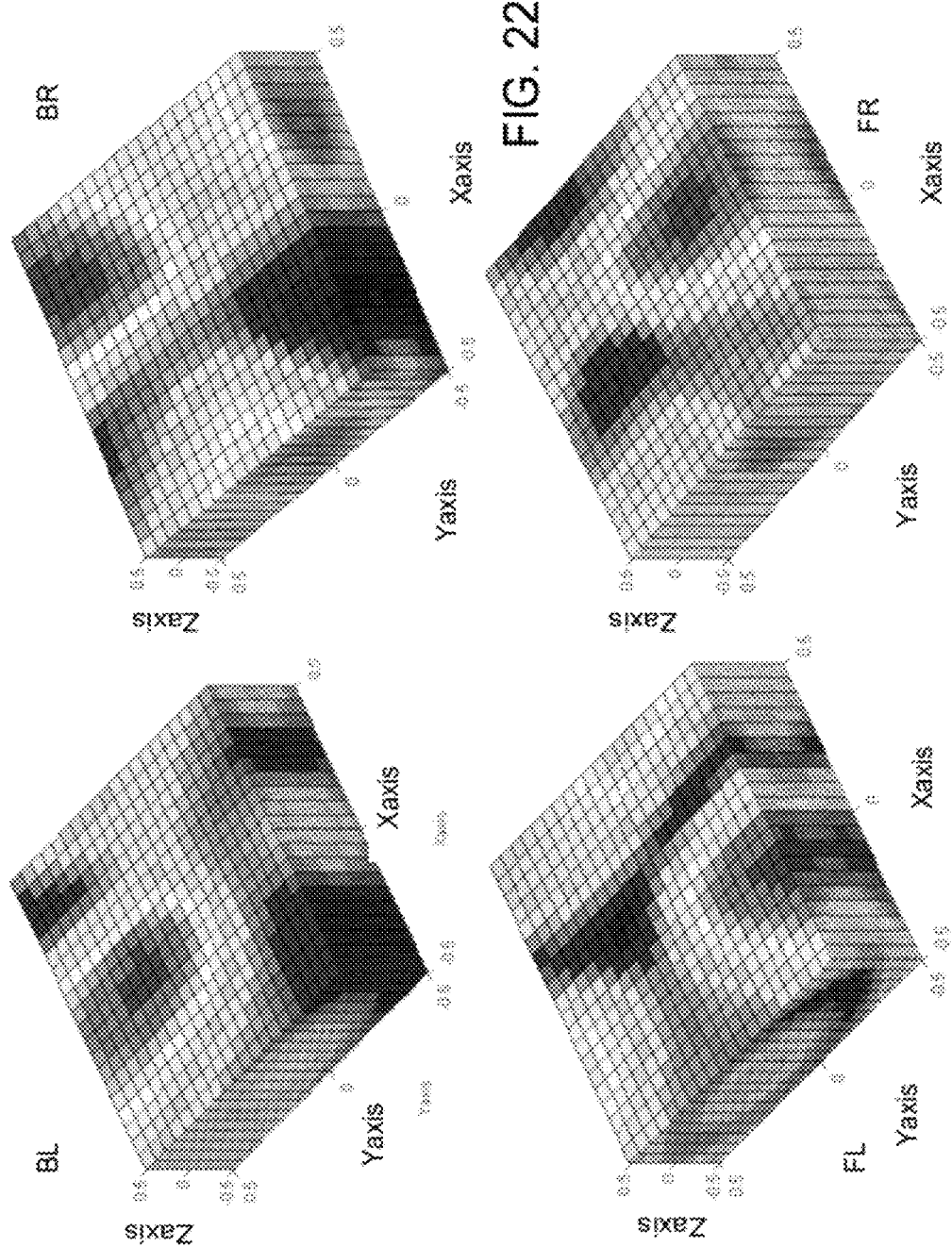
FIG. 22 shows examples of IVA converged filter beam patterns learned on refined mobile speaker data.

The beam pattern may vary depending on the acquired mixture data. FIG. 21 shows examples of IVA converged filter beam patterns learned on mobile speaker data. FIG. 22 shows examples of IVA converged filter beam patterns learned on refined mobile speaker data. These examples are the same as shown in FIG. 21, except for the FR beam pattern.

The process of training a four-microphone filter using IVA includes not only beaming toward the desired direction, but also nulling the interference directions. For example, the filter for front-left (FL) direction is converged to a solution that includes a beam toward the FL direction and nulls in the front-right (FR), back-left (BL), and back-right (BR) directions. Such a training operation can be done deterministically if the exact microphone array geometry is already known. Alternatively, the IVA process may be performed with rich training data, in which one or more audio sources (e.g., speech, a musical instrument, etc.) are located at each corner and captured by the four-microphone array. In this case, the training process may be performed once regardless of microphone configuration (i.e., without the necessity of information regarding microphone geometry), and the filter may be fixed for a particular array configuration at a later time. As long as the array includes four microphones in a projected two-dimensional (x-y) plane, the results of this learning processing can be applied to produce an appropriate set of four corner filters. It is expressly noted that so long as the microphones of the array are arranged in two orthogonal or nearly orthogonal axes (e.g., within 15 degrees of orthogonal), such a trained filter may be used to record a surround sound image without the constraint of a particular microphone array configuration. For example, a three-microphone array is sufficient if the two axes are very close to orthogonal, and the ratio between the separations between the microphones on each axis is not important.

As noted above, a wideband (e.g., HD) signal may be obtained by spatially processing the low frequency and passing the high frequency terms. However, processing of the entire frequency region may be performed instead, if the increase in computational complexity is not a significant concern for the particular design. Because the four-microphone IVA approach focuses more on nulling than beaming, the effect of aliasing in the high-frequency terms is reduced. Null aliasing happens only at rare frequencies in the beaming direction, such that most of the frequency region in the beaming direction will remain unaffected by the null aliasing, especially for small inter-microphone distances. For larger inter-microphone distances, the nulling actually becomes randomized, such that the effect is similar to the case of just passing unprocessed high-frequency terms.

For a small form factor (e.g., a handheld device), it may be desirable to avoid performing spatial filtering at low frequencies, as the microphone spacing may be too small to support a good result, and performance in higher frequencies may be compromised. Likewise, it may be desirable to avoid performing spatial filtering at high frequencies, as such frequencies are typically directional already, and filtering may be ineffective for frequencies above the spatial aliasing frequency.

If fewer than four microphones are used, it may be difficult to form nulls at the three other corners (e.g., due to insufficient degrees of freedom). In this case, it may be desirable to use an alternative, such as end-fire pairing as discussed above with reference to FIGS. 17, 23B, and 23C.

Figure 25:
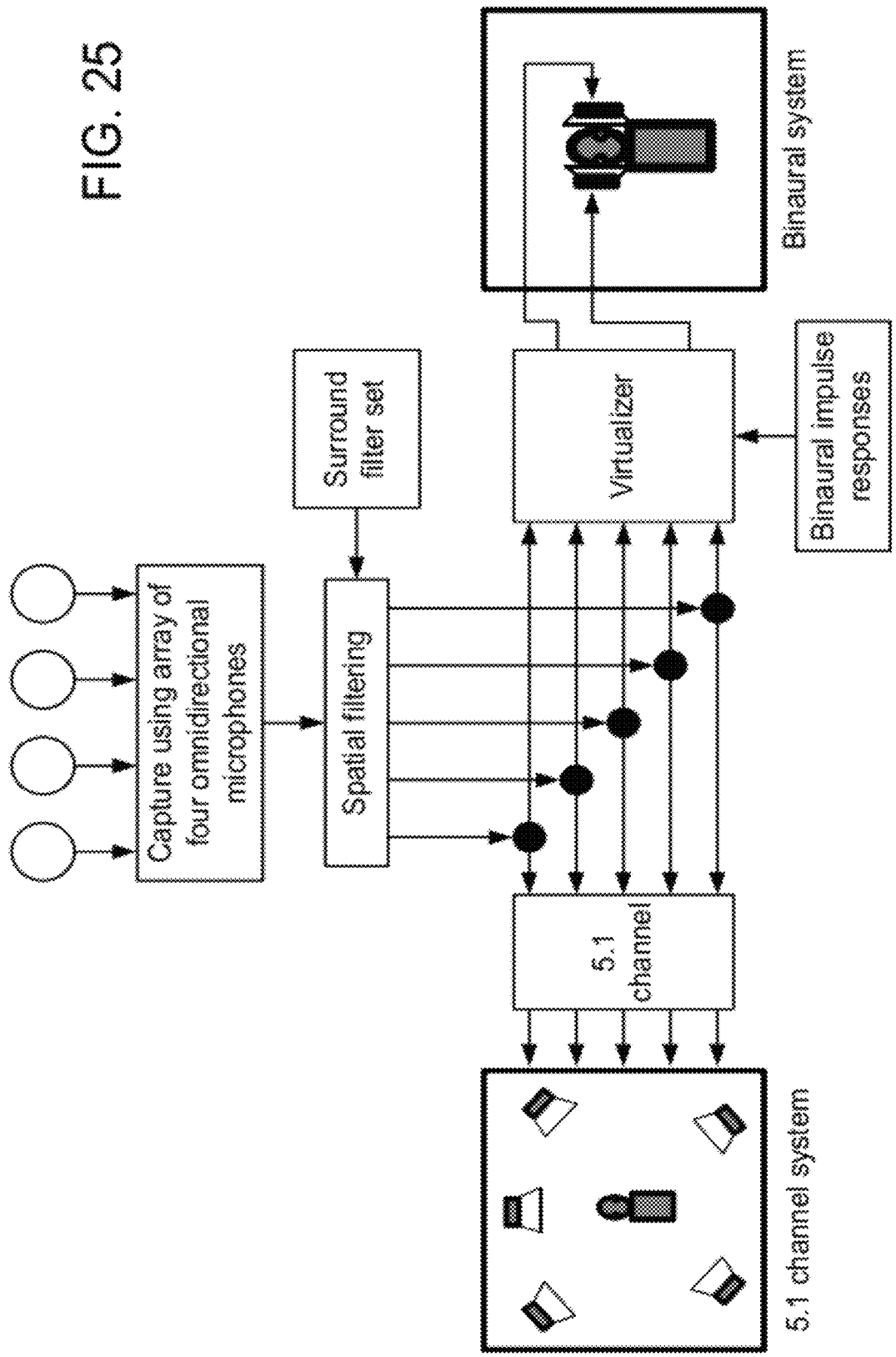
FIG. 25 shows a system for providing a 5.1-channel recording from a signal recorded using multiple omnidirectional microphones and for reproducing such a recording using headphones.

This description includes disclosures of providing a 5.1-channel recording from a signal recorded using multiple omnidirectional microphones (e.g., as illustrated in the center-to-left path of FIG. 25). It may be desirable to create a binaural recording from a signal captured using multiple omnidirectional microphones. If there is no 5.1 channel surround system from the user side, for example, it may be desirable to downmix the 5.1 channels to a stereo binaural recording so that the user can have experience of being in an actual acoustic space with the surround sound system. Also, this capability can provide an option wherein the user can monitor the surround recording while they are recording the scene on the spot and/or play back the recorded video and surround sound on his mobile device using a stereo headset instead of a home theater system.

We can have directional sound sources from the array of omnidirectional microphones, which are intended to be played through loudspeakers located at the designated locations (FL, FR, C, BL (or surround left), and BR (or surround right)) in a typical living room space. One method of reproducing this situation only with headphones (e.g., as illustrated in the center-to-right path in FIG. 25) includes an offline process of measuring binaural impulse responses (BIRs) (e.g., binaural transfer functions) from each loudspeaker to a microphone located inside of each ear in the desired acoustic space. The BIRs encode the acoustic path information, including the direct path as well as the reflection paths from each loudspeaker, for every source-receiver pair among the array of loudspeakers and the two ears. We may locate small microphones inside of real human ears, or use a dummy head such as a Head and Torso Simulator (HATS, Bruel and Kjaer, DK) with silicone ears.

For binaural reproduction, the measured BIRs are convolved with each directional sound source for the designated loudspeaker location. After convolving all the directional sources with the BIRs, the results are summed for each ear recording. The end result is two channels (e.g., left and right) which replicate the left and right signals captured by human ears and can be played though a headphone. Note that 5.1 surround generation from the array of omnidirectional microphones is actually used as a via-point from the array to binaural reproduction. Therefore, this scheme can be generalized depending on how the via-point is generated. For example, if we create more directional sources from the signals captured by the array, we can use them as a via-point with appropriately measured BIRs from the desired loudspeaker location to the ears.

It may be desirable to perform a method as described herein within a portable audio sensing device that has an array R100 of two or more microphones configured to receive acoustic signals. Examples of a portable audio sensing device that may be implemented to include such an array and may be used for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, tablet computer, or other portable computing device. The class of portable computing devices currently includes devices having names such as laptop computers, notebook computers, netbook computers, ultra-portable computers, tablet computers, mobile Internet devices, smartbooks, and smartphones. Such a device may have a top panel that includes a display screen and a bottom panel that may include a keyboard, wherein the two panels may be connected in a clamshell or other hinged relationship. Such a device may be similarly implemented as a tablet computer that includes a touchscreen display on a top surface. Other examples of audio sensing devices that may be constructed to perform such a method and to include instances of array R100 and may be used for audio recording and/or voice communications applications include set-top boxes and audio- and/or video-conferencing devices.

Figure 29A:
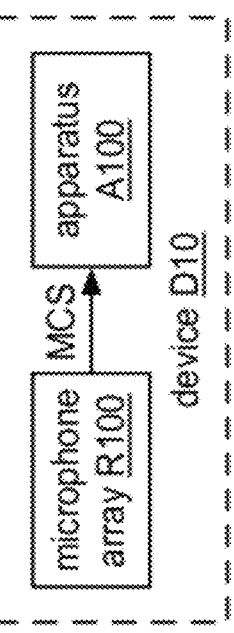
FIG. 29A shows a block diagram of a multimicrophone audio sensing device D10 according to a general configuration.

FIG. 29A shows a block diagram of a multimicrophone audio sensing device D10 according to a general configuration. Device D10 includes an instance of any of the implementations of microphone array R100 disclosed herein, and any of the audio sensing devices disclosed herein may be implemented as an instance of device D10. Device D10 also includes an apparatus A100 that is configured to process the multichannel audio signal MCS by performing an implementation of a method as disclosed herein. Apparatus A100 may be implemented as a combination of hardware (e.g., a processor) with software and/or with firmware.

Figure 29B:
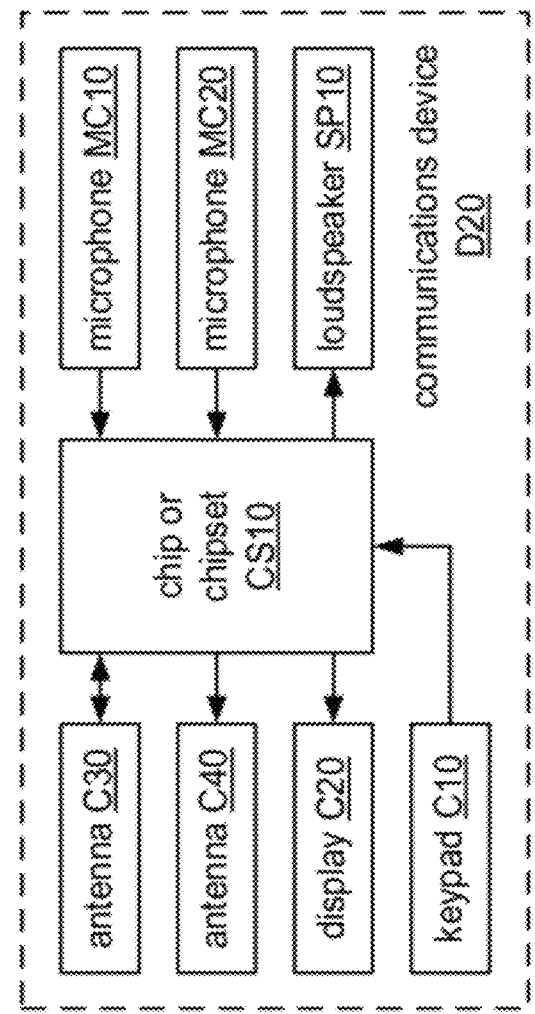
FIG. 29B shows a block diagram of a communications device D20 that is an implementation of device D10.

FIG. 29B shows a block diagram of a communications device D20 that is an implementation of device D10. Device D20 includes a keypad C10, a display C20, antennas C30, C40, microphones MC10, MC20, a loudspeaker SP10 and a chip or chipset CS 10 (e.g., a mobile station modem (MSM) chipset) that includes apparatus A100. Chip/chipset CS10 may include one or more processors. Chip/chipset CS10 may also include processing elements of array R100 (e.g., elements of audio preprocessing stage AP10 as described below). Chip/chipset CS10 includes a receiver, which is configured to receive a radio-frequency (RF) communications signal and to decode and reproduce an audio signal encoded within the RF signal, and a transmitter, which is configured to encode an audio signal that is based on a processed signal produced by apparatus A100 and to transmit an RF communications signal that describes the encoded audio signal. For example, one or more processors of chip/chipset CS10 may be configured to perform a noise reduction operation as described above on one or more channels of the multichannel signal such that the encoded audio signal is based on the noise-reduced signal.

Each microphone of array R100 may have a response that is omnidirectional, bidirectional, or unidirectional (e.g., cardioid). The various types of microphones that may be used in array R100 include (without limitation) piezoelectric microphones, dynamic microphones, and electret microphones. In a device for portable voice communications, such as a handset or headset, the center-to-center spacing between adjacent microphones of array R100 is typically in the range of from about 1.5 cm to about 4.5 cm, although a larger spacing (e.g., up to 10 or 15 cm) is also possible in a device such as a handset or smartphone, and even larger spacings (e.g., up to 20, 25 or 30 cm or more) are possible in a device such as a tablet computer. The microphones of array R100 may be arranged along a line (with uniform or non-uniform microphone spacing) or, alternatively, such that their centers lie at the vertices of a two-dimensional (e.g., triangular) or three-dimensional shape.

It is expressly noted that the microphones may be implemented more generally as transducers sensitive to radiations or emissions other than sound. In one such example, the microphone pair is implemented as a pair of ultrasonic transducers (e.g., transducers sensitive to acoustic frequencies greater than fifteen, twenty, twenty-five, thirty, forty, or fifty kilohertz or more).

During the operation of a multi-microphone audio sensing device, array R100 produces a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

It may be desirable for array R100 to perform one or more processing operations on the signals produced by the microphones to produce the multichannel signal MCS. FIG. 28A shows a block diagram of an implementation R200 of array R100 that includes microphones MC10, MC20 and an audio preprocessing stage AP10 configured to perform one or more such operations, which may include (without limitation) impedance matching, analog-to-digital conversion, gain control, and/or filtering in the analog and/or digital domains.

FIG. 28B shows a block diagram of an implementation R210 of array R200. Array R210 includes an implementation AP20 of audio preprocessing stage AP10 that includes analog preprocessing stages P10a and P10b. In one example, stages P10a and P10b are each configured to perform a highpass filtering operation (e.g., with a cutoff frequency of 50, 100, or 200 Hz) on the corresponding microphone signal.

It may be desirable for array R100 to produce the multichannel signal as a digital signal, that is to say, as a sequence of samples. Array R210, for example, includes analog-to-digital converters (ADCs) C10a and C10b that are each arranged to sample the corresponding analog channel. Typical sampling rates for acoustic applications include 8 kHz, 12 kHz, 16 kHz, and other frequencies in the range of from about 8 to about 16 kHz, although sampling rates as high as about 44 kHz may also be used. In this particular example, array R210 also includes digital preprocessing stages P20a and P20b that are each configured to perform one or more preprocessing operations (e.g., echo cancellation, noise reduction, and/or spectral shaping) on the corresponding digitized channel to produce the corresponding channels MCS-1, MCS-2 of multichannel signal MCS. Although FIGS. 28A and 28B show two-channel implementations, it will be understood that the same principles may be extended to an arbitrary number of microphones and corresponding channels of multichannel signal MCS.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, or 44 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing for more aggressive noise reduction.

The various elements of an implementation of an apparatus as disclosed herein may be embodied in any combination of hardware with software, and/or with firmware, that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a directional encoding procedure, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to store desired program code, in the form of instructions or data structures, in tangible structures that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of audio signal processing by a device, said method comprising:
    decomposing a recorded auditory scene, recorded using three microphones that form two microphone pairs on the device, into a first category of localizable sources and a second category of ambient sound, wherein each localizable source represents one of multiple different directions, wherein each direction represents one of multiple corners of the device, wherein the corners of the device include a front left direction, a back left direction, a front right direction, and a back right direction, and wherein the directions are associated with a standard channel format surround sound system;
    recording an indication of the direction of each of the localizable sources; and
    applying at least one multichannel filter to a plurality of recorded input channels of the auditory scene by combining two overlapping beams to enhance one of the localizable sources associated with one of the directions and applying a null beam in all other of the directions.

2. A method according to claim 1, wherein said method comprises receiving user input that comprises a desired recording direction.

3. A method according to claim 1, wherein said method comprises estimating a number of the localizable sources, including estimating a direction of arrival of each source.

4. A method according to claim 1, wherein said method comprises encoding a recorded multichannel signal according to a three-dimensional audio encoding scheme.

5. A method according to claim 4, wherein the three-dimensional audio encoding scheme is at least one among an Ambisonic scheme and a wavefield synthesis scheme.

6. A method according to claim 1, wherein the combining two overlapping beams comprises:
    applying a beam in one endfire direction to obtain a first filtered signal;
    applying a beam in another endfire direction to obtain a second filtered signal; and
    combining the first filtered signal with a delayed version of the second filtered signal.

7. A method according to claim 1, wherein the combining two overlapping beams comprises:
    applying a beam in one endfire direction to obtain a first filtered signal;
    applying a beam in another endfire direction to obtain a second filtered signal; and
    combining the first and second filtered signals to obtain a combined signal,
    wherein each of the first and second filtered signals has at least two channels, and
    wherein one channel of the combined signal is delayed relative to another channel of the combined signal.

8. The method according to claim 7, wherein said method comprises, prior to said combining, delaying one channel of the first filtered signal relative to another channel of the first filtered signal and delaying one channel of the second filtered signal relative to another channel of the second filtered signal.

9. The method according to claim 7, wherein said method comprises delaying one channel of the combined signal relative to another channel of the combined signal.

10. A method according to claim 1, wherein the combining two overlapping beams comprises:
    applying a filter having a beam in a first direction to a signal produced by a first pair of microphones to obtain a first spatially filtered signal;
    applying a filter having a beam in a second direction different from the first direction to a signal produced by a second pair of microphones that is different from the first pair of microphones to obtain a second spatially filtered signal; and
    combining the first and second spatially filtered signals to obtain an output signal corresponding to a source in a third direction different than the first and second directions.

11. The method according to claim 10, wherein an axis of the first pair of microphones is at least substantially orthogonal to an axis of the second pair of microphones.

12. A method according to claim 10, wherein said applying the filter having the beam in the first direction is limited to frequencies between a low threshold and a high threshold, and
    wherein at least one of the low and high thresholds is based on a distance between microphones.

13. A method according to claim 1, wherein said method comprises:
    for each of the three microphones in an array, recording a corresponding input channel; and
    for each of the directions, applying a corresponding multichannel filter to the plurality of the recorded input channels to obtain a corresponding output channel.

14. The method according to claim 13, wherein an axis of a first pair of the three microphones is not more than fifteen degrees from orthogonal to an axis of a second pair of the three microphones.

15. The method according to claim 13, wherein there are at least four directions that each represent one of the corners of the device.

16. The method according to claim 13, wherein said method comprises processing the plurality of output channels to produce a binaural recording,
wherein said processing includes, for each of the plurality of output channels, applying a corresponding binaural impulse response to the output channel to obtain a corresponding binaural signal,
wherein said binaural recording is based on a sum of said binaural signals.

17. A method according to claim 1, wherein said method comprises selecting a recording direction based on an orientation of a portable audio sensing device.

18. A method according to claim 1, wherein said method includes training a plurality of filters to generate a corresponding plurality of fixed converged filters; and
applying the fixed converged filters to the recorded auditory scene to perform said decomposing.

19. The method of claim 1, wherein the three microphones are substantially in a same plane as a display of the device.

20. An apparatus for audio signal processing, said apparatus comprising:
means for decomposing a recorded auditory scene, recorded using three microphones that form two microphone pairs on the apparatus, into a first category of localizable sources and a second category of ambient sound, wherein each localizable source represents one of multiple different directions, wherein each direction represents one of multiple corners of the apparatus, wherein the corners of the apparatus include a front left direction, a back left direction, a front right direction, and a back right direction, and wherein the directions are associated with a standard channel format surround sound system;
means for recording an indication of the direction of each of the localizable sources; and
means for applying at least one multichannel filter to a plurality of recorded input channels of the auditory scene by combining two overlapping beams to enhance one of the localizable sources associated with one of the directions and applying a null beam in all other of the directions.

21. An apparatus according to claim 20, wherein said apparatus comprises means for receiving user input that comprises a desired recording direction.

22. An apparatus according to claim 20, wherein said apparatus comprises means for estimating a number of the localizable sources, including means for estimating a direction of arrival of each source.

23. An apparatus for audio signal processing, said apparatus comprising:
a display configured to present a user interface; and
one or more processors configured to:
decompose a recorded auditory scene, recorded using three microphones that form two microphone pairs on the apparatus, into a first category of localizable sources and a second category of ambient sound, wherein each localizable source represents one of multiple different directions, wherein each direction represents one of multiple corners of the apparatus, wherein the corners of the apparatus include a front left direction, a back left direction, a front right direction, and a back right direction, and wherein the directions are associated with a standard channel format surround sound system;
record an indication of the direction of each of the localizable sources; and
apply at least one multichannel filter to a plurality of recorded input channels of the auditory scene by combining two overlapping beams to enhance one of the localizable sources associated with one of the directions and applying a null beam in all other of the directions.

24. An apparatus according to claim 23, wherein the one or more processors are configured to receive user input that comprises a desired recording direction.

25. An apparatus according to claim 23, wherein the one or more processors are configured to estimating a number of the localizable sources, including estimating a direction of arrival of each source.

26. An apparatus according to claim 23, wherein the one or more processors are configured to encode a recorded multichannel signal according to a three-dimensional audio encoding scheme.

27. An apparatus according to claim 26, wherein the three-dimensional audio encoding scheme is at least one among an Ambisonic scheme and a wavefield synthesis scheme.

28. An apparatus according to claim 23, wherein the one or more processors configured to apply at least one multichannel filter by combining two overlapping beams are further configured to:
apply a beam in one endfire direction to obtain a first filtered signal;
apply a beam in another endfire direction to obtain a second filtered signal; and
combine the first filtered signal with a delayed version of the second filtered signal.

29. An apparatus according to claim 28, wherein applying the beam in the one endfire direction is configured to apply the beam only to frequencies between a low threshold and a high threshold, and
wherein at least one of the low and high thresholds is based on a distance between microphones.

30. An apparatus according to claim 23, wherein the one or more processors configured to apply at least one multichannel filter by combining two overlapping beams are further configured to:
apply a beam in one endfire direction to obtain a first filtered signal;
apply a beam in another endfire direction to obtain a second filtered signal; and
combine the first and second filtered signals to obtain a combined signal,
wherein each of the first and second filtered signals has at least two channels, and
wherein one channel of the combined signal is delayed relative to another channel of the combined signal.

31. An apparatus according to claim 30, wherein the one or more processors are configured to delay one channel of the first filtered signal relative to another channel of the first filtered signal and delay one channel of the second filtered signal relative to another channel of the second filtered signal, prior to said combining.

32. An apparatus according to claim 30, wherein the one or more processors are configured to delay one channel of the combined signal relative to another channel of the combined signal.

33. An apparatus according to claim 23, wherein the one or more processors configured to apply at least one multichannel filter by combining two overlapping beams are further configured to:

apply a filter having a beam in a first direction to a signal produced by a first pair of microphones to obtain a first spatially filtered signal;

apply a filter having a beam in a second direction different from the first direction to a signal produced by a second pair of microphones that is different from the first pair of microphones to obtain a second spatially filtered signal; and combine the first and second spatially filtered signals to obtain an output signal corresponding to a source in a third direction different than the first and second directions.

34. An apparatus according to claim 33, wherein an axis of the first pair of microphones is at least substantially orthogonal to an axis of the second pair of microphones.

35. An apparatus according to claim 23, wherein the one or more processors are configured to:

record, for each of the three microphones in an array, a corresponding input channel; and apply, for each of the directions, a corresponding multichannel filter to the plurality of the recorded input channels to obtain a corresponding output channel.

36. An apparatus according to claim 35, wherein an axis of a first pair of the three microphones is not more than fifteen degrees from orthogonal to an axis of a second pair of the three microphones.

37. The apparatus according to claim 35, wherein there are at least four directions that each represent one of the corners of the apparatus.

38. An apparatus according to claim 35, wherein the one or more processors are configured to process the plurality of output channels to produce a binaural recording, wherein said processing includes, for each of the plurality of output channels, applying a corresponding binaural impulse response to the output channel to obtain a corresponding binaural signal, wherein said binaural recording is based on a sum of said binaural signals.

39. An apparatus according to claim 23, wherein the one or more processors are configured to select a recording direction based on an orientation of a portable audio sensing device.

40. A non-transitory machine-readable storage medium comprising tangible features that when read by a device cause the device to:

decompose a recorded auditory scene, recorded using three microphones that form two microphone pairs on the device, into a first category of localizable sources and a second category of ambient sound, wherein each localizable source represents one of multiple different directions, wherein each direction represents one of multiple corners of the device, wherein the corners of the device include a front left direction, a back left direction, a front right direction, and a back right direction, and wherein the directions are associated with a standard channel format surround sound system;

record an indication of the direction of each of the localizable sources; and apply at least one multichannel filter to a plurality of recorded input channels of the auditory scene by combining two overlapping beams to enhance one of the localizable sources associated with one of the directions and applying a null beam in all other of the directions.

* * * * *